US007227164B2

(12) United States Patent
Sakai et al.

(10) Patent No.: US 7,227,164 B2
(45) Date of Patent: Jun. 5, 2007

(54) MEDIA WIDTH DETECTING APPARATUS

(75) Inventors: Hironobu Sakai, Fukushima-ken (JP); Hiroaki Ono, Fukushima-ken (JP); Yasuo Noda, Fukushima-ken (JP); Naoki Sato, Fukushima-ken (JP); Minoru Kanno, Fukushima-ken (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 10/926,745

(22) Filed: Aug. 26, 2004

(65) Prior Publication Data

US 2005/0058495 A1 Mar. 17, 2005

(30) Foreign Application Priority Data

Aug. 27, 2003 (JP) ............................ 2003-209071
Jun. 7, 2004 (JP) ............................ 2004-168435

(51) Int. Cl.
*G01N 21/86* (2006.01)

(52) U.S. Cl. .......................... 250/559.24; 250/559.19; 101/484

(58) Field of Classification Search ........... 250/559.24, 250/559.26, 559.19; 101/484–486; 358/449, 358/488; 347/19
See application file for complete search history.

(56) References Cited

U.S. PATENT DOCUMENTS

| | | | | |
|---|---|---|---|---|
| 4,778,272 | A * | 10/1988 | Asakura | 356/625 |
| 5,568,573 | A * | 10/1996 | Wada et al. | 382/317 |
| 5,687,010 | A * | 11/1997 | Van Tilborg et al. | 358/496 |
| 5,895,928 | A * | 4/1999 | Kerschner | 250/559.37 |
| 6,313,928 | B1 * | 11/2001 | Yu | 358/488 |
| 6,363,164 | B1 * | 3/2002 | Jones et al. | 382/135 |
| 6,622,625 | B1 * | 9/2003 | Sugiyama | 101/484 |
| 6,850,857 | B2 * | 2/2005 | Ignagni et al. | 702/104 |

FOREIGN PATENT DOCUMENTS

JP 11-208928 A 8/1999

* cited by examiner

*Primary Examiner*—Thanh X. Luu
*Assistant Examiner*—Stephen Yam
(74) *Attorney, Agent, or Firm*—Akin Gump Strauss Hauer & Feld LLp

(57) ABSTRACT

What is disclosed: is a media width detecting apparatus comprising: a first media detecting section to detect media, a second media detecting section put downward from said first media detecting section, to detect media; wherein said second detecting section decide range to detect media according to result of detection by said first media detecting section.

19 Claims, 28 Drawing Sheets

MEDIA WIDTH DETECTING APPARATUS

BACKGROUND OF THE INVENTION

1. Field of the Invention

The present invention relates to a media width detecting apparatus provided in a printer, for example, a serial impact dot matrix (SIDM) printer, so as to detect the width of the print media.

2. Description of Related Art

In conventional art, for example a SIDM printer, there is provided is an apparatus having a function of detecting media width as well as having a function of canceling the skew of print media. In this kind of apparatus, an inserted print medium is conveyed by rollers with comparatively small coefficients of friction and the print medium is pressed to a shutter. The entire front edge portion of the print medium is then pressed to the shutter, so as to cancel skew.

Moreover, in order to detect the position of every portion of the print medium inserted in the apparatus, that is, the left end position and the right end position; sheet width sensors are provided on a carriage conducting a spacing motion. This allows the left end position and the right end position of the print medium are detected by the sheet width sensor when the print medium is inserted with the moving carriage.

The point of detecting the sheet width of the print medium is set at a position of ¼ inch, for example, apart from the front edge of the print medium. Optical sensors of reflection type are used for sheet width detecting sensors. Light is then emitted to surface of the print medium and, reflected light from medium is received by the sensor, thus detecting whether a medium exists or not. This kind of media width detecting apparatus is disclosed in, for example, JP11-208928.

However, in the conventional apparatus mentioned above, sheet width sensors provided on a carriage, move across the range of the whole width of the media conveying path, so as to detect side end portions of a print medium. Therefore, if there is something, for example dust or a piece of sheet etc., on the platen which confronts the carriage; the dust or piece of sheet etc., can be detected as print medium by mistake. In this occasion, medium width is not detected properly, and the print starting position can be outside of the medium. And therefore printing cannot be performed properly. Moreover, printing is performed directly on the platen thus damaging the platen and the print head.

Moreover, as mentioned above, the conventional apparatus detects sheet width at a prescribed position (for example, a position of ¼ inch apart from the front end) by using optical sensors of a reflection type as sheet width detecting sensors. Such sensors can prove problematic when the print medium contains dark pre-printed matter. As a result, the sheet width sensors can detect the end portion of a pre-printed portion of the print medium as the end position of the print medium itself.

SUMMARY OF THE INVENTION

For the purpose of solving problems mentioned above, according to one aspect of the present invention, there is provided a media width detecting apparatus comprising: a first media detecting section to detect media, a second media detecting section put downward from said first media detecting section, to detect media; wherein the said second detecting section decide range to detect media is decided according to the result of the detection by said first media detecting section.

According to another aspect of the present invention, there is provided a media width detecting apparatus comprising: plural first media detecting section provided in a media conveying path, at least a second media detecting section put on a moving body moving over media conveyed along said media conveying path; wherein said second detecting section range to detect medium is decided according to the result of the detection of existence of medium by said first media detecting section, and a judgment that positions where said second media detecting section detected changes of said result of detection are at the extreme left and the extreme right in said range to detect media and are end portions of said medium.

DESCRIPTION OF THE PREFERRED EMBODIMENTS

Figure 1:
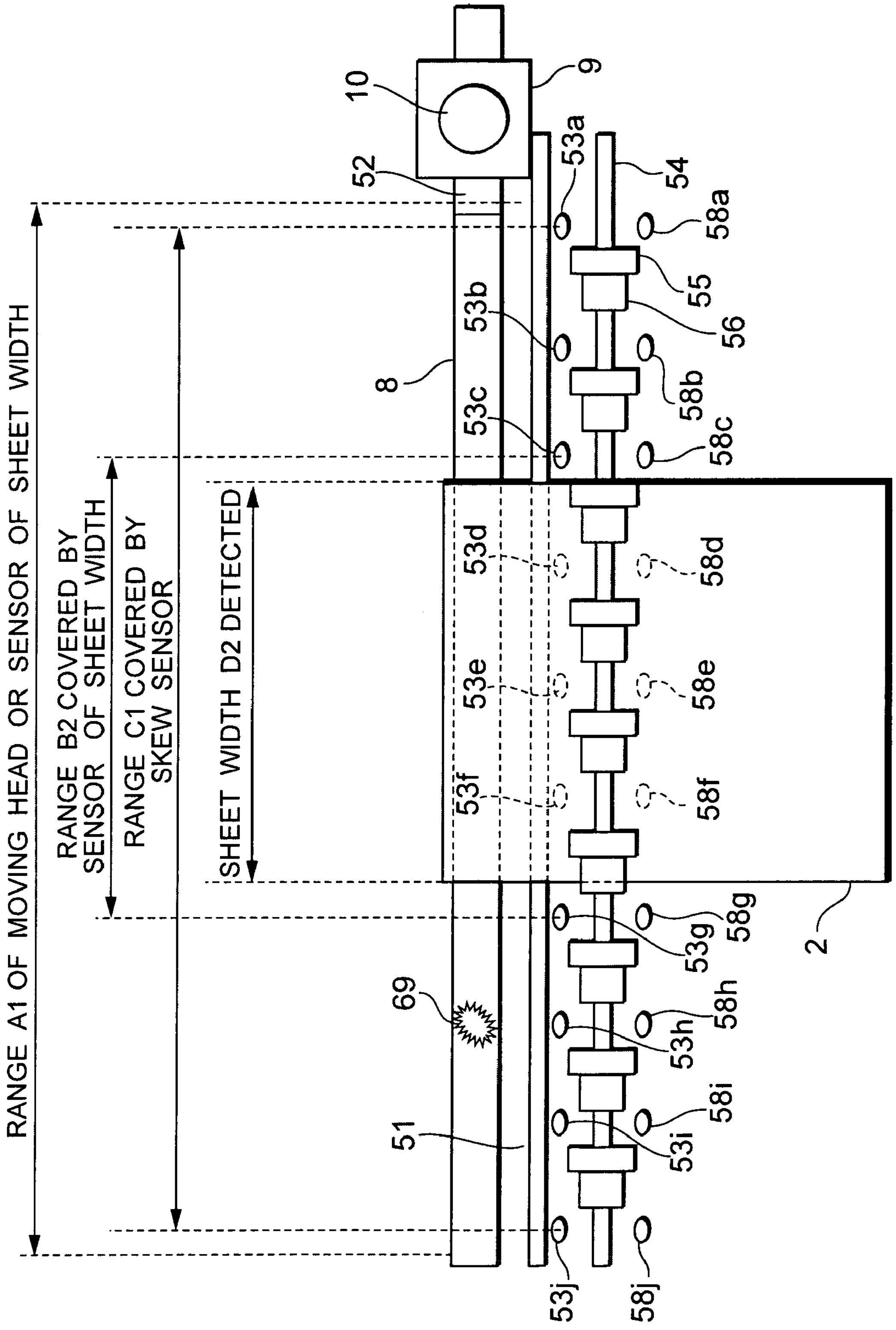
FIG. 1 is a sketched diagram showing a media width detecting apparatus according to Embodiment 1.

Hereafter, Embodiments of present invention are described, referring to the drawings mentioned above. In each Embodiment, a media width detecting apparatus provided in a SIDM printer is described as an example of present invention. And, in the description, the same elements shown in different drawings are designated with same symbols.

Embodiment 1

<Configuration>

Figure 2:
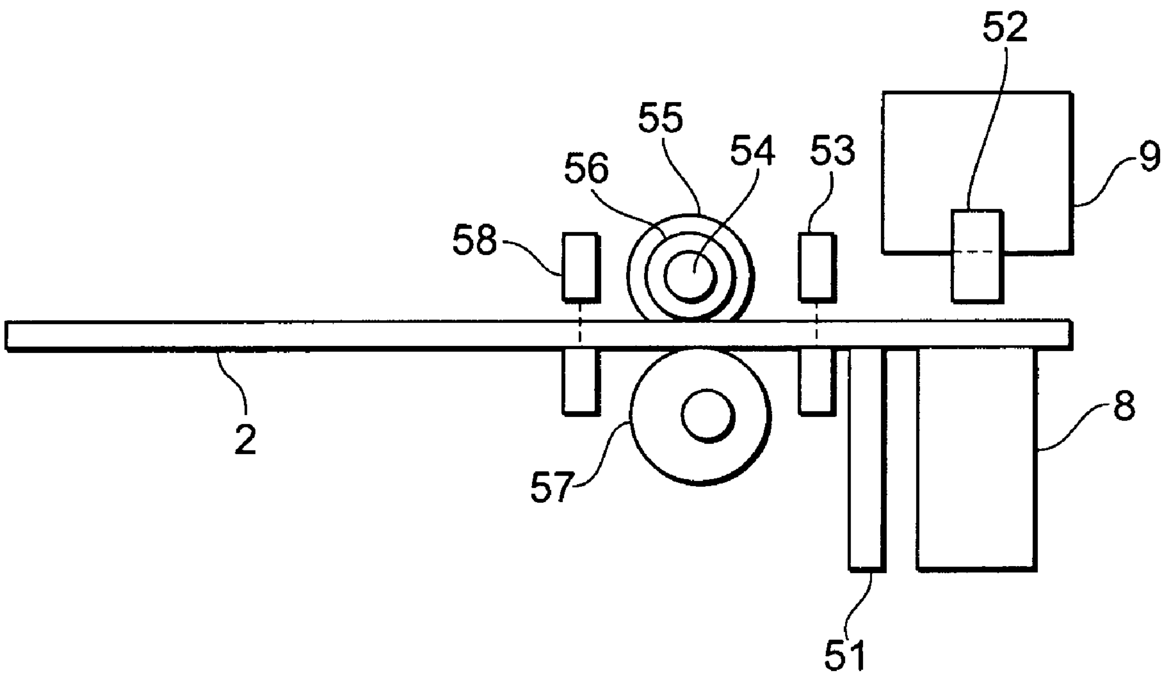
FIG. 2 is a side view showing a media width detecting apparatus according to Embodiment 1.

FIG. 1 is a sketched diagram showing a media width detecting apparatus according to Embodiment 1; and FIG. 2 is a side view showing a media width detecting apparatus according to Embodiment 1.

In FIG. 1 and FIG. 2, a SIDM printer has a carriage 9 where a print head 10 is mounted. This carriage 9 is moved by a driving means not shown in the drawings. A platen 8 is provided under the carriage 9. and, a shutter 51, able to move up and down, is provided along the platen 8. A sheet width sensor 52 for detecting side end portions of printing sheet 2, is provided in a lower portion of carriage 9.

Along the shutter 51, skew sensors 53 of plural number (ten in FIG. 1 as 53*a* to 53*j*) are provided at prescribed positions with equal intervals in a direction perpendicular to the conveying direction of sheet 2. The skew sensors 53 are sensors for detecting whether printing sheet 2 inserted is skew or not. Each skew sensor 53 comprises a light emitting element and a light receiving element. Moreover, a roller shaft 54 is provided in the same direction and plural skew rollers 55 and plural feed rollers 56 are mounted on the roller shaft 54. The surface of each skew roller 55 is formed of material having a comparatively low friction coefficient. Each feed roller 56 has a diameter smaller than the diameter of skew roller 55 and it is able to move up and down. The surface of each feed roller 56 is formed of material having a friction coefficient higher than skew roller 55. Each feed roller 57 is provided confronting with each skew roller 55 and feed roller 56. The feed roller 56 is able to convey sheet 2 with feed roller 57 when the skew roller 55 is pressed to shrink.

Along the roller shaft 54, table sensors 58 of plural number (ten in FIG. 1 as 58*a* to 58*j*) are provided at prescribed positions with equal intervals. The table sensors 58 are arrayed in a direction perpendicular to conveying direction of sheet 2. Each of table sensors 58 correspond to each of skew sensors 53. That is, table sensor 58*a* is arrayed with skew sensor 53*a* in direction of conveying sheet 2, table sensor 58*b* is arrayed with skew sensor 53*b* in the direction of conveying sheet 2, and so on. The table sensors 58 are sensors for detecting whether printing sheet 2 inserted skews or not, as well as skew sensors 53. The table sensors 58 and skew sensors 53 comprise light emitting elements and light receiving elements.

Figure 3:
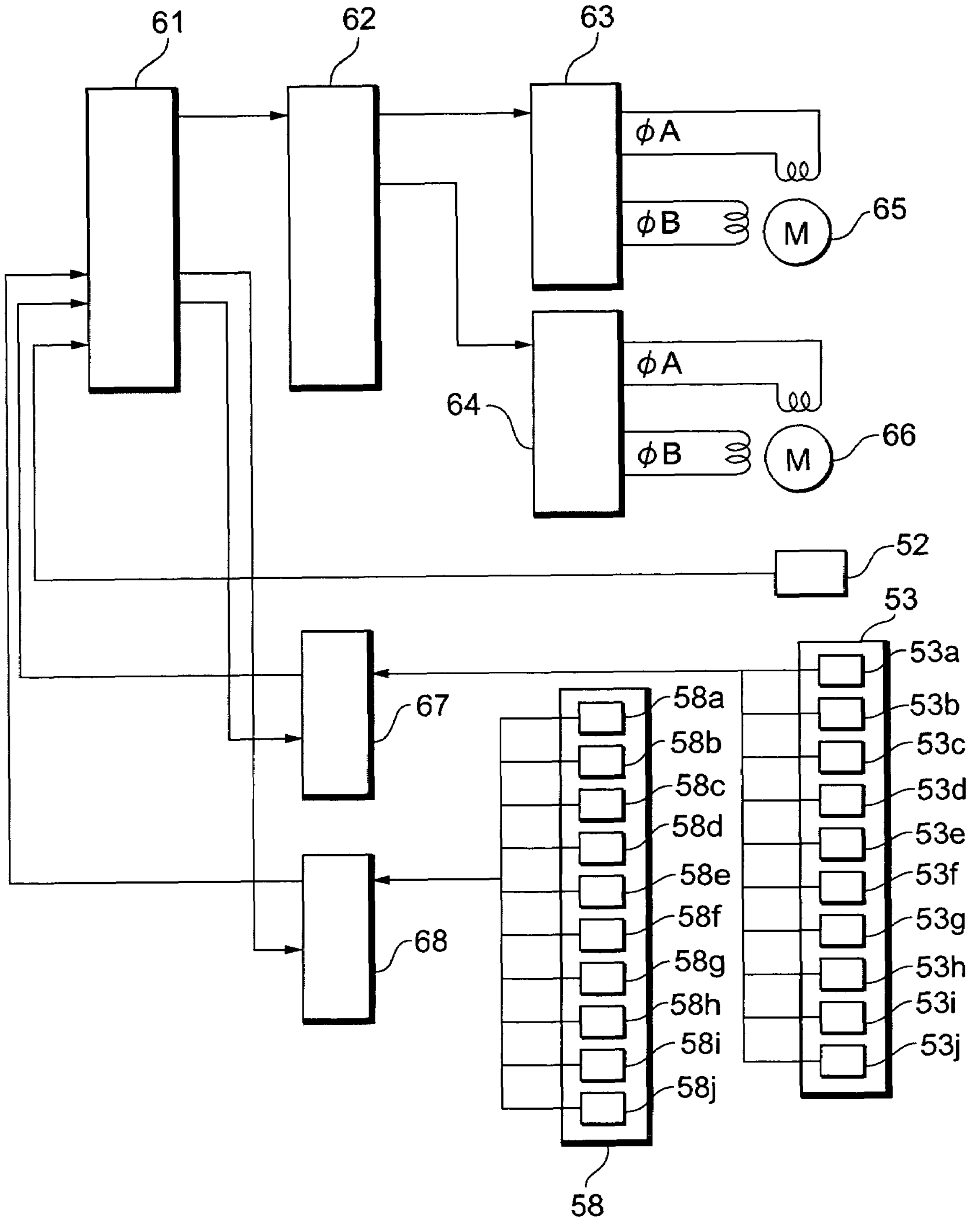
FIG. 3 is a block diagram showing a media width detecting apparatus according to Embodiment 1.

FIG. 3 is a block diagram of media width detecting apparatus of Embodiment 1. In FIG. 3, CPU 61 is what controls overall operation of apparatus. This CPU 61 is connected with LSI 62 by way of signal lines.

LSI 62 is connected with LF motor driver 63 and mode changing motor driver 64 respectively by way of signal lines. The LF motor driver 63 is connected with LF motor 65 by way of drive lines ϕA, ϕB. The mode changing motor driver 64 is connected with mode motor 66 by way of drive lines ϕA, ϕB.

An output of sheet width sensor 52 is connected with an input port of CPU 61 by way of a signal line. Each output of skew sensor 53 is connected with each input port of skew selector 67 by way of each signal line. Output of skew selector 67 is inputted to CPU 61 by way of a signal line. Each output of table sensor 58 is connected with each input port of table selector 68 by way of each signal line. Output of table selector 68 is inputted to CPU 61 by way of signal line. Further, CPU 61 puts out control signals to skew selector 67 and to table selector 68 by way of signal lines.

<Operation>

Figure 4:
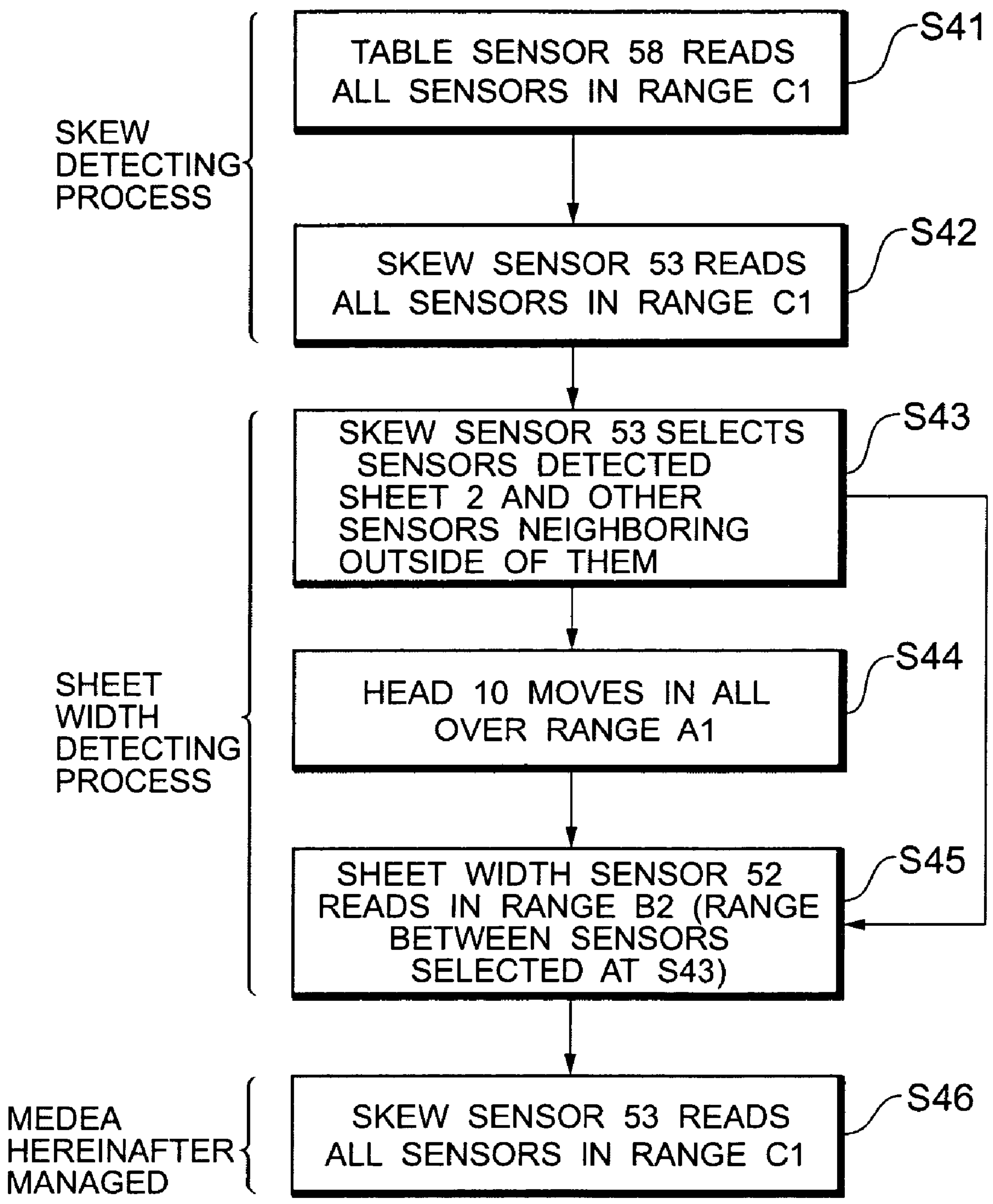
FIG. 4 is a flow chart showing an outline of operation of Embodiment 1.

Subsequently described is an operation of Embodiment 1. Here, chiefly described is an operation of detecting width of sheets. However, an outline of operation is described referring to FIG. 4, beforehand. FIG. 4 is a flow chart showing an outline of operation of Embodiment 1.

In FIG. 4, the whole process comprises three processes. The first process is a skew detecting process. This process includes a process (step 41) of reading all table sensors 58*a* to 58*j* arrayed, and a process (step 42) of reading all skew sensors 53*a* to 53*j* arrayed. The second process is a sheet width detecting process. The sheet width detecting process comprises a process (step 43) of selecting sensors which detected sheet 2 and selecting each of both sides of a series of sensors detecting sheet 2, a process (step 44) of moving carriage 9 (print head 10) across the whole range, and a process (step 45) of reading sheet width sensor 52 in area of skew sensors selected at step 43. The third process is a process (step 46) of reading all skew sensors 53, so as to perform control of managing media.

Figure 5:
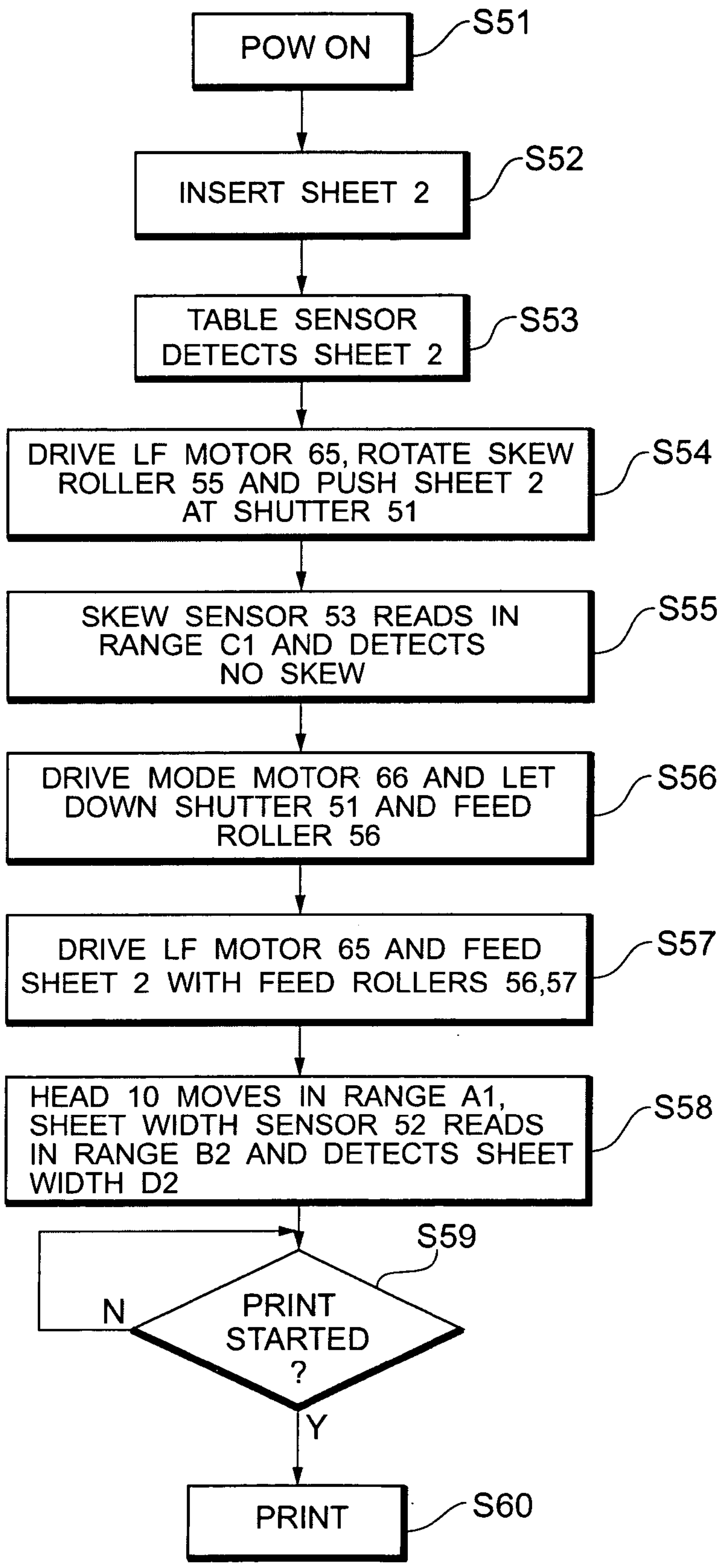
FIG. 5 is a flow chart showing operation of Embodiment 1.

Succeedingly described is a detailed operation referring to flow chart of FIG. 5. FIG. 5 is a flow chart showing an operation of Embodiment 1. At first, a power unit of printer is turned on (step 51). Then, the printer performs an initial operation and it waits for an operator to insert sheet 2.

When sheet 2 is inserted by an operator (step 52), the table sensors 58 detect the sheet 2 (step 53). Here, among the table sensors 58, what actually detected sheet 2 are table sensors 58*d* to 58*f* as shown in FIG. 1. So, each output of the table sensors 58*d* to 58*f* are sent to the table selector 68 as a sheet existing signal. CPU 61 is always watching each sensor to judge which sensor is transmitting on. That is, CPU 61 is detecting, at input port, the on/off state of each sensor, which is put out from the table selector 68 selecting each output of sensors one by one at prescribed time interval.

When either of the table sensors transitions on, CPU 61 puts out an indication to LSI 62, to drive LF motor 65, so as to roll skew rollers 55 to press sheet 2 at shutter 51 (step 54). LSI 62, according to the indication, puts out control signal to LF motor driver 63. LF motor driver 63, according to the control signal, puts out drive current ϕA, ϕB, so as to drive LF motor 65. When LF motor is driven, skew rollers 55 and feed rollers 56 roll in the direction of conveying sheet 2 to print head 10.

In this occasion, feed rollers 56 do not contact with sheet 2. Only skew rollers 55 contact with sheet 2. The surface of each skew roller 55 is formed with a material of low friction coefficient. Therefore, in the occasion when the skew of sheet 2 occurred, some of the skew rollers 55 slip on the sheet 2 after either left or right end portion of sheet 2 pressed at shutter 51. On the other hand, other skew rollers 55 forward the sheet 2. Thereby, after rolling skew rollers 55 for a prescribed time, the other end portion of sheet 2 comes at the shutter 51 as well. Therefore, skew is canceled.

Subsequently, CPU 61 reads all sensors 53*a* to 53*j* of skew sensors 53. That is, it reads in range C1 shown in FIG. 1. Thus, the range where sheet 2 exists is detected. CPU 61 compares this range with the range where the table sensors 58 are detecting sheet 2. Then, as a result, if both of ranges are same, CPU 61 judges that skew of sheet 2 is not occurring (step 55).

Subsequently, CPU 61 puts out an indication to LSI 62, to drive mode motor 66, so as to let down shutter 51 and feed roller 56 (step 56). LSI 62, according to the indication, puts out a control signal to mode changing motor driver 64. Mode changing motor driver 64, according to the control signal, puts out drive current ϕA, ϕB, so as to drive mode motor 66. When mode motor 66 is driven, shutter 51 and feed roller 56 are let down. Then, the feed roller 56 clips the sheet 2 with the lower feed roller 57.

Subsequently, CPU 61 puts out indication to LSI 62, to drive LF motor 65, so as to feed sheet 2 with feed rollers 56 and 57 (step 57). LSI 62, according to the indication, puts out a control signal to LF motor driver 63. LF motor driver 63, according to the control signal, puts out drive current ϕA, ϕB, so as to drive LF motor 65. When LF motor is driven, feed rollers 56 and 57 roll in direction of conveying sheet 2 to print head 10. Thereby, sheet 2 is conveyed to printing position through space between printing head 10 and platen 8 and then, the sheet 2 stays at the printing position.

Subsequently, CPU 61 moves carriage 9 (print head 10) across whole range that carriage 9 is able to move. (A1 shown in FIG. 1) (step 58). In this occasion, it is already detected that the sheet 2 exists between the skew sensor 53*c* and the skew sensor 53*g* (range of B2 shown in FIG. 1) by the result of detection with skew sensors 53. Therefore, in order to detect both side portions of sheet 2, to search in this range B2 is enough for the sheet width sensor 52 to detect them. That is, CPU 61 reads output of sheet width sensor 52 while the sheet width sensor 52 on the carriage 9 is moving in this range B2. Thereby, both side portions of sheet 2 are detected and sheet width D2 shown in FIG. 1 is obtained.

Therefore, even if there is a piece of sheet 69 on platen 8, as shown in FIG. 1 for example; the piece of sheet 69 is not detected as a portion of sheet 2, because the portion of sheet 69 is out of the range of reading by sheet width sensor 52. Thus, wrong detection can be avoided. CPU 61 waits for printing to start (step 59) and printing is performed in the range D2 detected, when preparation of printing is completed.

In Embodiment 1 mentioned above, in the occasion of moving carriage 9, carriage 9 can be moved rapidly, in a range where the sheet width sensor 52 does not perform reading (a range in region A1 excluding the range B2). Also, the carriage 9 can be moved rapidly, when the carriage 9 with the sheet width sensor 52 returns after detecting sheet width. Thus, throughput of printing can be increased.

<Effects>

As described above, according to Embodiment 1, the width of sheet 2 is detected by reading the sheet width sensor 52, in a range where the sheet 2 is detected by sheet width sensor 52. Therefore, reading can be performed only in the range near positions where the sheet 2 exist and the width of the sheet 2 is detected exactly, even when dust or piece of sheet exists on the platen.

Embodiment 2

<Configuration>

<Operation>

Figure 6:
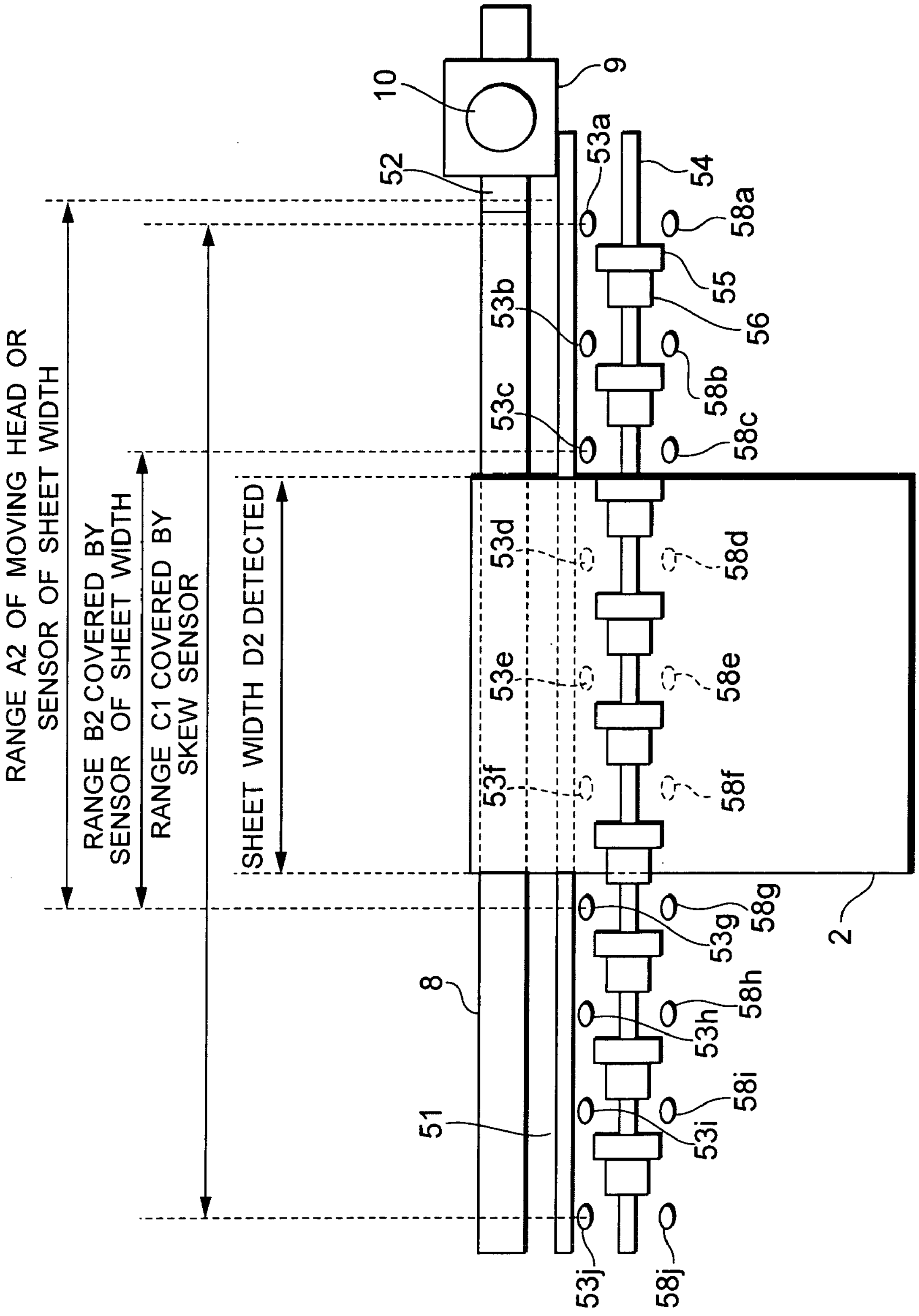
FIG. 6 is a sketched diagram showing a media width detecting apparatus according to Embodiment 2.
Figure 7:
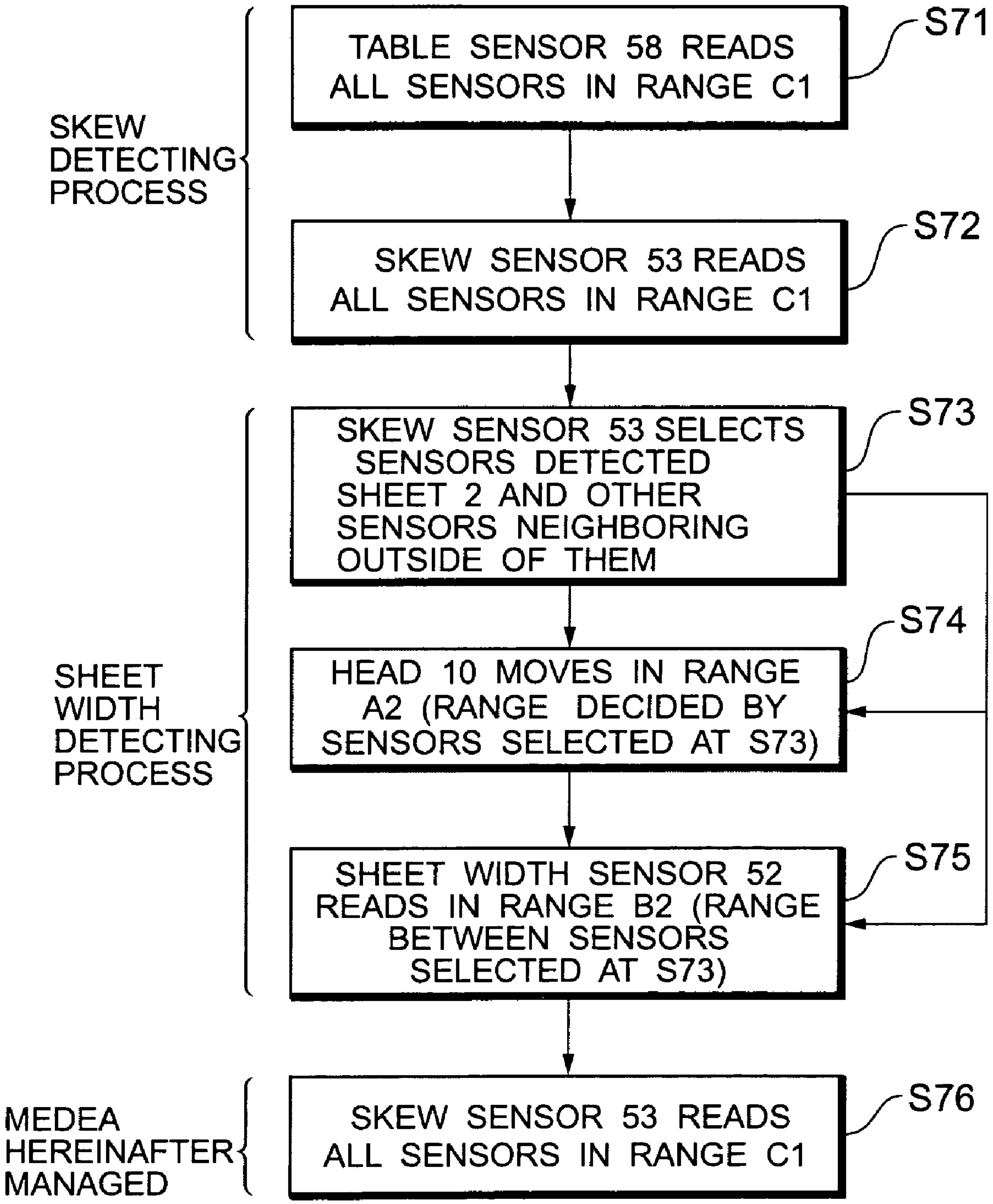
FIG. 7 is a flow chart showing an outline of operation of Embodiment 2.
Figure 8:
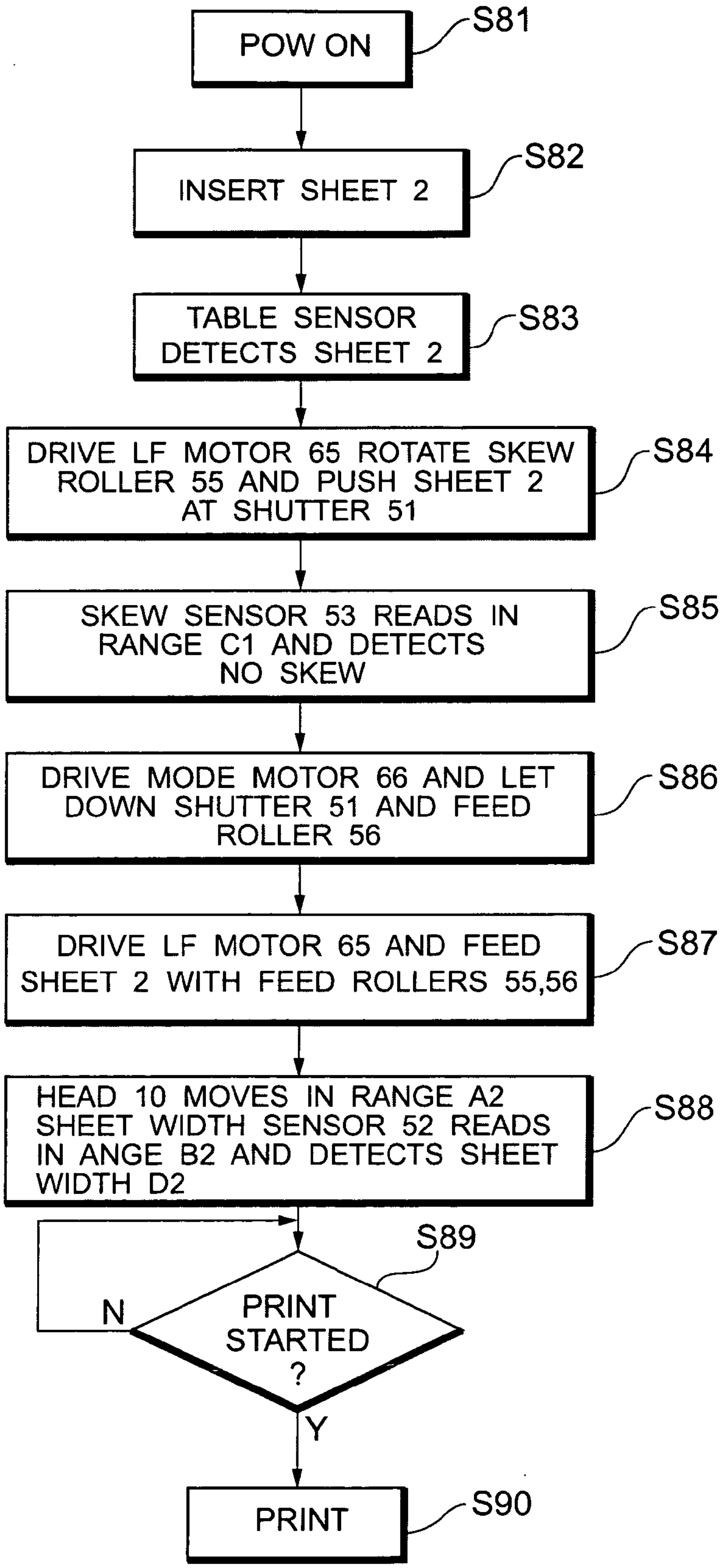
FIG. 8 is a flow chart showing operation of Embodiment 2.

Subsequently described is Embodiment 2. Configuration of Embodiment 2 is the same as that of Embodiment 1. Therefore, the same description of configuration is omitted. Here, an operation of detecting sheet width of Embodiment 2 is described, referring to FIG. 6, FIG. 7 and FIG. 8. FIG. 6 is an outline configuration showing a media width detecting apparatus according to Embodiment 2. FIG. 7 is a flow chart showing an outline operation of Embodiment 2. FIG. 8 is a flow chart showing an operation of Embodiment 2. At first, an outline of operation is described referring to FIGS. 4 and 5. In the description, elements of Embodiment 1 are used.

In FIGS. 6 and 7, the whole process comprises, as same as Embodiment 1, three processes of a skew detecting process, a sheet width detecting process, and a process of managing media after above processes.

The skew detecting process includes a process (step 71) of reading all table sensors 58*a* to 58*j* arrayed, and a process (step 72) of reading all skew sensors 53*a* to 53*j* arrayed. The next process is a sheet width detecting process that comprises a process (step 73) of selecting sensors which detected sheet 2 and selecting each of both sides of a series of sensors detecting sheet 2, a process (step 74) of moving carriage 9 (print head 10) across area decided by positions of sensors selected at step 73, and a process (step 75) of reading sheet width sensor 52 in area of skew sensors selected at step 73. Moreover, the third process of managing media is a process (step 76) of reading all skew sensors 53, so as to perform control of managing media.

Succeedingly described is a detailed operation referring to flow chart of FIG. 8. Steps 81 to 87 shown in FIG. 8 are steps 51 to 57 of Embodiment 1. At step 87, it is already detected that the sheet 2 exists between the skew sensor 53*c* and the skew sensor 53*g* (range of B2 shown in FIG. 6) by the result of detection with skew sensors 53.

At step 88, side end portions of sheet can be detected in a range of sensors (53*c* to 53*g*) which are decided by sensors neighboring outside of the sensors (53*d* to 53*f*) detecting existence of a sheet in sheet detection by skew sensors 53. Therefore, CPU 61 moves carriage 9 (print head 10) across a range from the right end position shown in FIG. 6 to a position corresponding to skew sensor 53*g* (range A2 shown in FIG. 6) (step 88). In this occasion, the sheet width sensor 52 reads a range between the skew sensor 53*c* and the skew sensor 53*g* (range of B2 shown in FIG. 1). That is, CPU 61 reads output of sheet width sensor 52 while the sheet width sensor 52 on the carriage 9 is moving in this range B2. Thereby, both side portions of sheet 2 are detected and sheet width D2 shown in FIG. 1 is obtained.

Therefore, as same as in Embodiment 1, even if there is a piece of sheet on platen 8 for example, the piece of sheet 69 is not detected as a portion of sheet 2. Thus, wrong detection can be avoided. CPU 61 waits for printing to start (step 89) and printing is performed in the range D2 detected, when preparation of printing is completed (step 90).

In Embodiment 2 as well as Embodiment 1, in the occasion of moving carriage 9, carriage 9 can be moved rapidly, in a range where the sheet width sensor 52 does not perform reading (a range in region A1 excluding the range B2). The carriage 9 can be moved rapidly, when the carriage 9 with the sheet width sensor 52 returns after detecting sheet width thus increasing the throughput of printing.

<Effects>

As described above, according to Embodiment 2, wrong detection can be prevented as well as in Embodiment 1, the time to detect the width of sheet 2 can be shortened, and throughput of printing can be increased, because the range to move carriage 9 is narrowed.

Embodiment 3

<Configuration>

<Operation>

Figure 9:
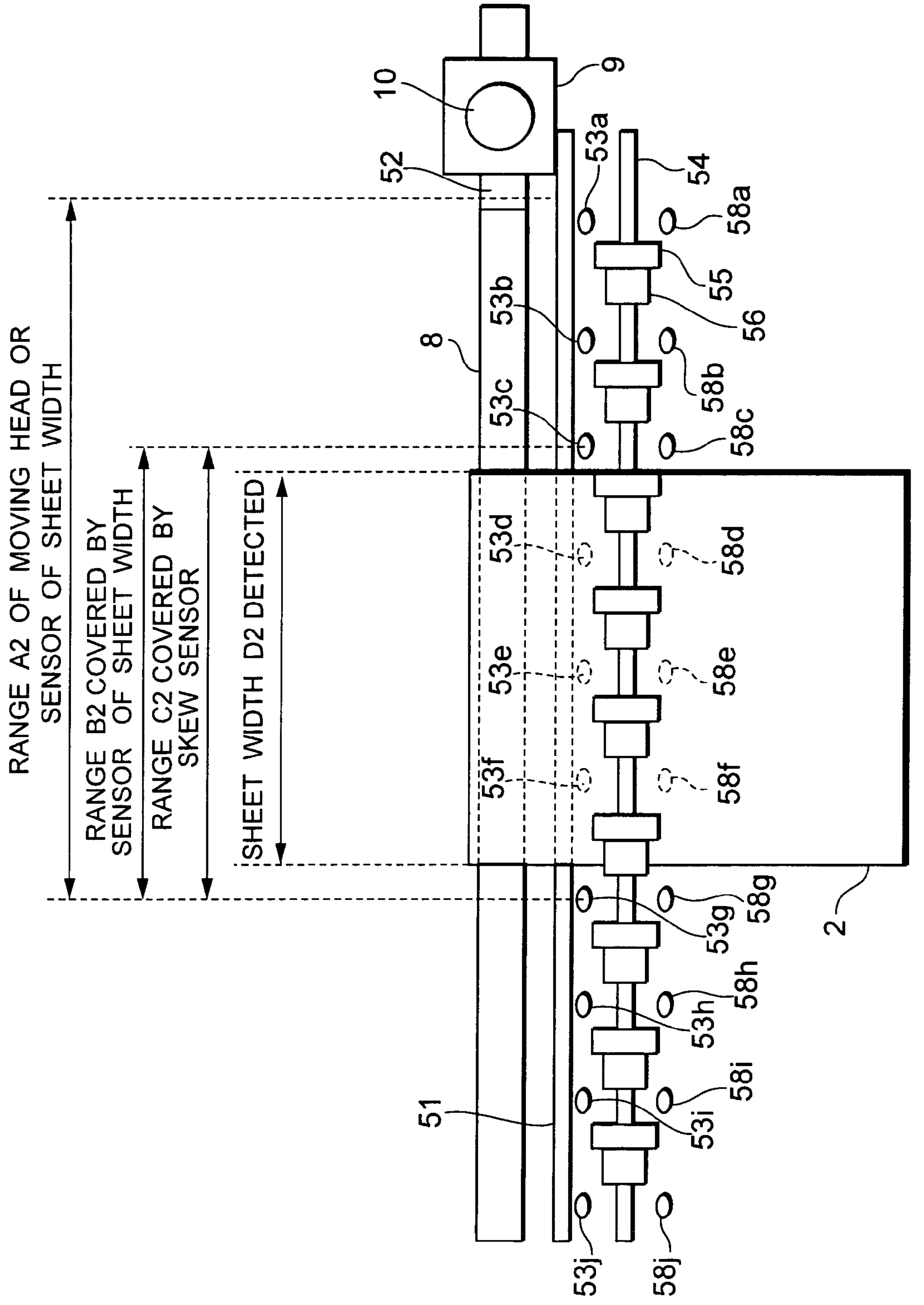
FIG. 9 is a sketched diagram showing a media width detecting apparatus according to Embodiment 3.
Figure 10:
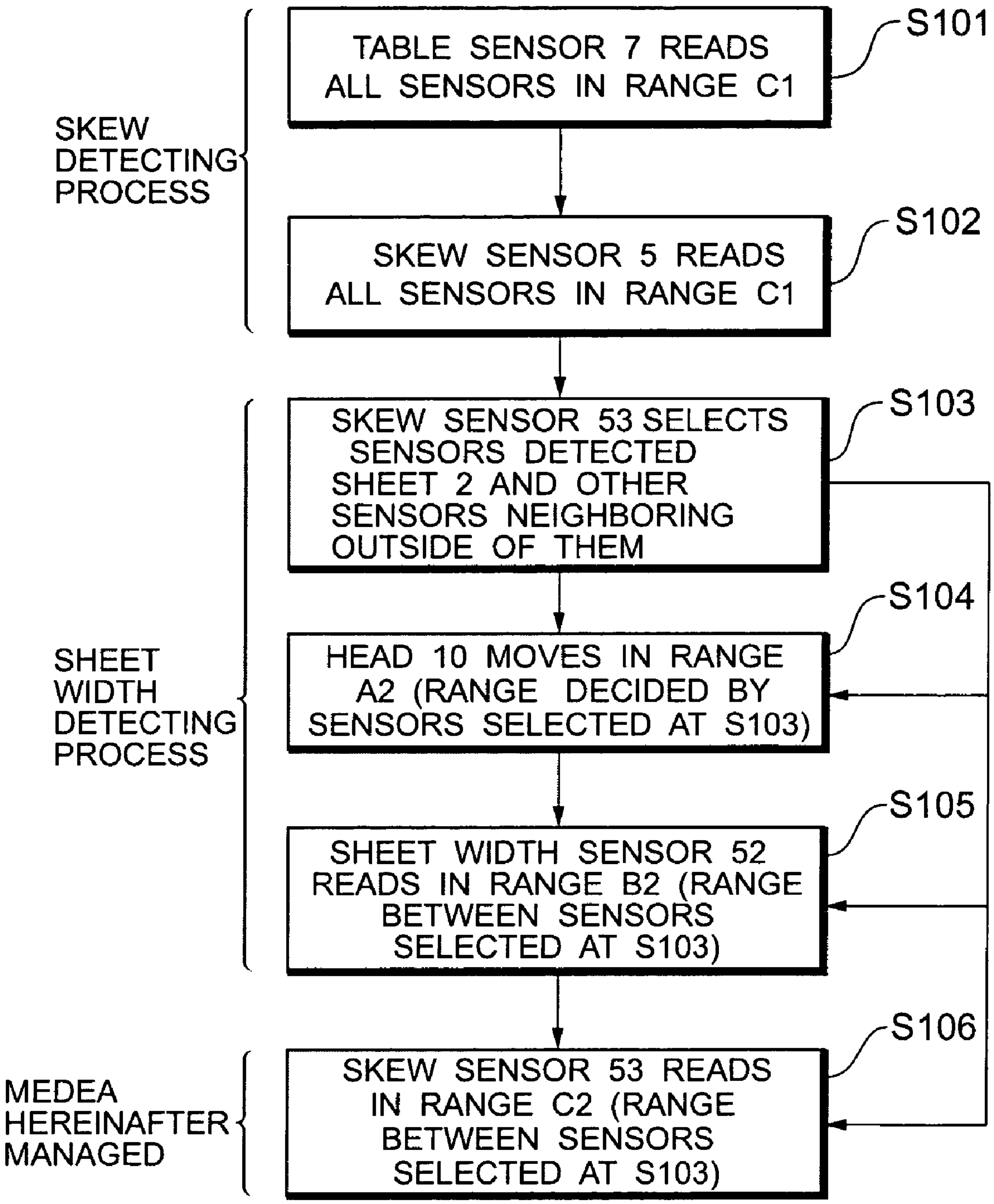
FIG. 10 is a flow chart showing an outline of operation of Embodiment 3.

Subsequently described is Embodiment 3. Configuration of Embodiment 3 is same as that of Embodiment 1. Therefore, the same description of configuration is omitted. Here, an operation of Embodiment 3 is described, referring to FIG. 9 and FIG. 10. FIG. 9 is an outline configuration showing a media width detecting apparatus according to Embodiment 3. FIG. 10 is a flow chart showing an outline operation of Embodiment 3. An outline of operation is described referring to FIGS. 9 and 10. In the description, elements of Embodiment 1 are used.

In FIGS. 9 and 10, the whole process comprises three processes of a skew detecting process, a sheet width detecting process, and a process of managing media after the above processes. The skew detecting process includes a process (step 101) of reading all table sensors 58*a* to 58*j* arrayed, and a process (step 102) of reading all skew sensors 53*a* to 53*j* arrayed. The process of a sheet width detecting process comprises a process (step 103) of selecting sensors which detected sheet 2 and selecting each of both sides of a series of sensors detecting sheet 2, a process (step 104) of moving carriage 9 (print head 10) across an area decided by positions of sensors selected at step 103, and a process (step 105) of reading sheet width sensor 52 in area of skew sensors selected at step 103.

Moreover, the third process of managing media is, in the occasion of detecting sheets by skew sensors 53 hereafter, a process (step 106) of reading skew sensors 53 in area of skew sensors selected at step 103, so as to perform control of managing media.

<Effects>

As mentioned above, in the process of detecting sheets hereafter, the range to read skew sensors is set to a range between sensors 53*c* and 53*g* which are decided by sensors neighboring outside of sensors 53*d* to 53*f* which primarily detected a sheet. This reading range is applied to all media management of detecting the lower end of sheet after it is inserted, or issuing of sheets etc. Thereby, it is not necessary to read all skew sensors 53 to detect sheets at each line changing. As a result, throughput is increased.

Incidentally, in each Embodiment mentioned above, reading range of sheet width sensor 52 is set to a range between sensors 53*c* and 53*g* which are neighboring outside of sensors 53*d* to 53*f* which detected a sheet. However, they are not limited to the neighboring outside of sensors 53*d* to 53*f* of 53*c* and 53*g*. They can be next neighboring of 53*b* and 53*h. They can be further next to them of* 53*a* and 53*i*. They are decided adequately according to the interval between sensors arrayed.

Moreover, in each Embodiment mentioned above, a media width detecting apparatus of a printer having a function of canceling skew, was described. However, the present invention can be applied to a printing apparatus of an electro-photographic printer or facsimile, or copying machine etc. Further, the present invention can be applied to an apparatus of detecting the width of a bankbook. For example, in a printing apparatus of an electro-photographic printer or a copying machine, plural sensors are provided at positions confronting with a sheet cassette containing sheets. The plural sensors detect movement of a sheet guide mounted on the sheet cassette. Thereby, the size of a sheet in sheet cassette is detected and a range of detecting a sheet by sheet detecting sensors in a conveying route, is decided according to the sheet size detected.

Embodiment 4

<Configuration>

Figure 11:
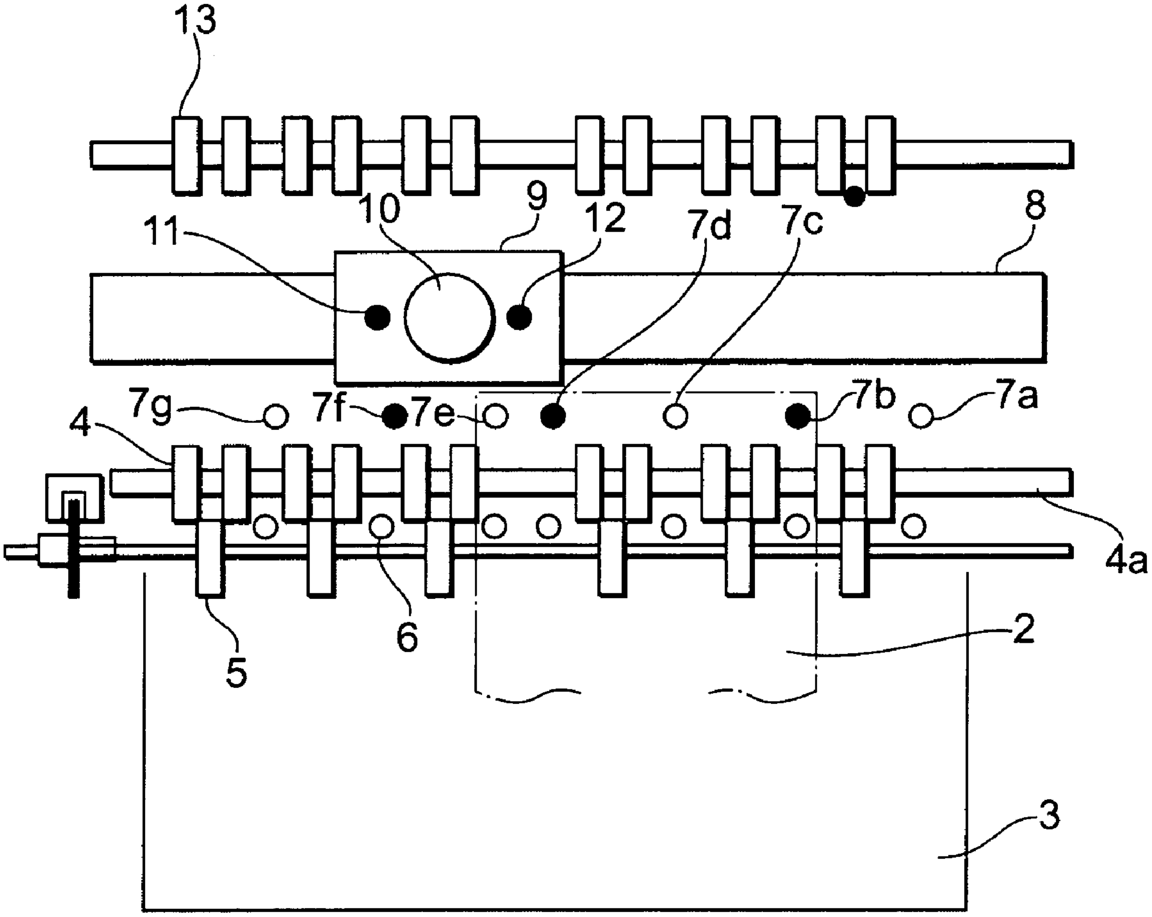
FIG. 11 is a sketched diagram showing a media detecting apparatus according to Embodiment 4.

Subsequently described is Embodiment 4. FIG. 11 is a sketched diagram showing a media detecting apparatus according to Embodiment 4. Incidentally, in each Embodiment hereafter described, a media detecting apparatus provided in a SIDM printer is described as an example.

In FIG. 11, shown is an SIDM printer 1 having a function of correcting skew. In the front side of the SIDM printer, provided is a table 3 where print sheet 2 of a single leaf is set front feed rollers 4 to convey print sheet 2 and skew correcting rollers 5 to push print sheet 2 to the front feed rollers 4 and to correct skew. In front of the front feed rollers 4, plural table sensors 6 (seven in FIG. 11) are provided along an axis 4*a* of front feed rollers 4. The table sensors 6 comprise optical sensors of a reflection type. A light ray is cast at the lower face of print sheet 2 conveyed and the table sensors 6 receive light reflected. Thereby, the existence of a sheet is detected. The range where table sensors 6 provided, is set to a range able to detect the whole of sheet 2 without fail wherever the sheet 2 of different sizes are set on the table 3.

Moreover, on the back side of front feed roller 4, plural front edge detecting/paper end sensors 7*a* to 7*g* (seven sensors) are provided along the axis of front feed rollers 4. The front edge detecting/paper end sensors 7*a* to 7*g* comprise optical sensors of reflection type and they receive light reflected from sheet 2. Thereby, the existence of sheet is detected. However, they comprise sensors 7*a*, 7*c*, 7*e*, 7*g* which receive light ray cast at the lower face of print sheet 2 and reflected and they also comprise sensors 7*b*, 7*d*, 7*f* which receive light ray cast at the upper face of print sheet 2 and reflected. Thus, the sensors which receive light ray cast at lower face, and sensors which receive light ray cast at upper face, are provided alternately. Thereby, even in the occasion when there is a black portion on either of both faces of print sheet 2, the existence of a sheet can be detected without fail. The range where front edge detecting/paper end sensors 7*a* to 7*g* provided, is set to a range able to detect the whole of sheet 2 without fail wherever the sheet 2 of different sizes is set on the table 3.

In the back side of front edge detecting/paper end sensors 7*a* to 7*g*, a platen 8 is provided. Moreover, a carriage 9 is provided and able to move along the platen 8. The carriage 9 has a print head 10 mounted and the print head 10 with carriage 9 moves along the platen 8. Thereby, printing is performed by print head 10, to a print sheet 2 conveyed between platen 8 and print head 10. On the carriage 9, sheet width detecting sensors 11 and 12 are mounted. A left sheet width detecting sensor 11 is a sensor for detecting left edge of sheet 2 and right sheet width detecting sensor 12 is a sensor for detecting right edge of sheet 2. They both are optical sensors of reflection type.

Further, in the back side of platen 8, rear feed rollers 13 are provided. The rear feed rollers 13 are rollers for letting out print sheet completed printing from the apparatus.

Figure 12:
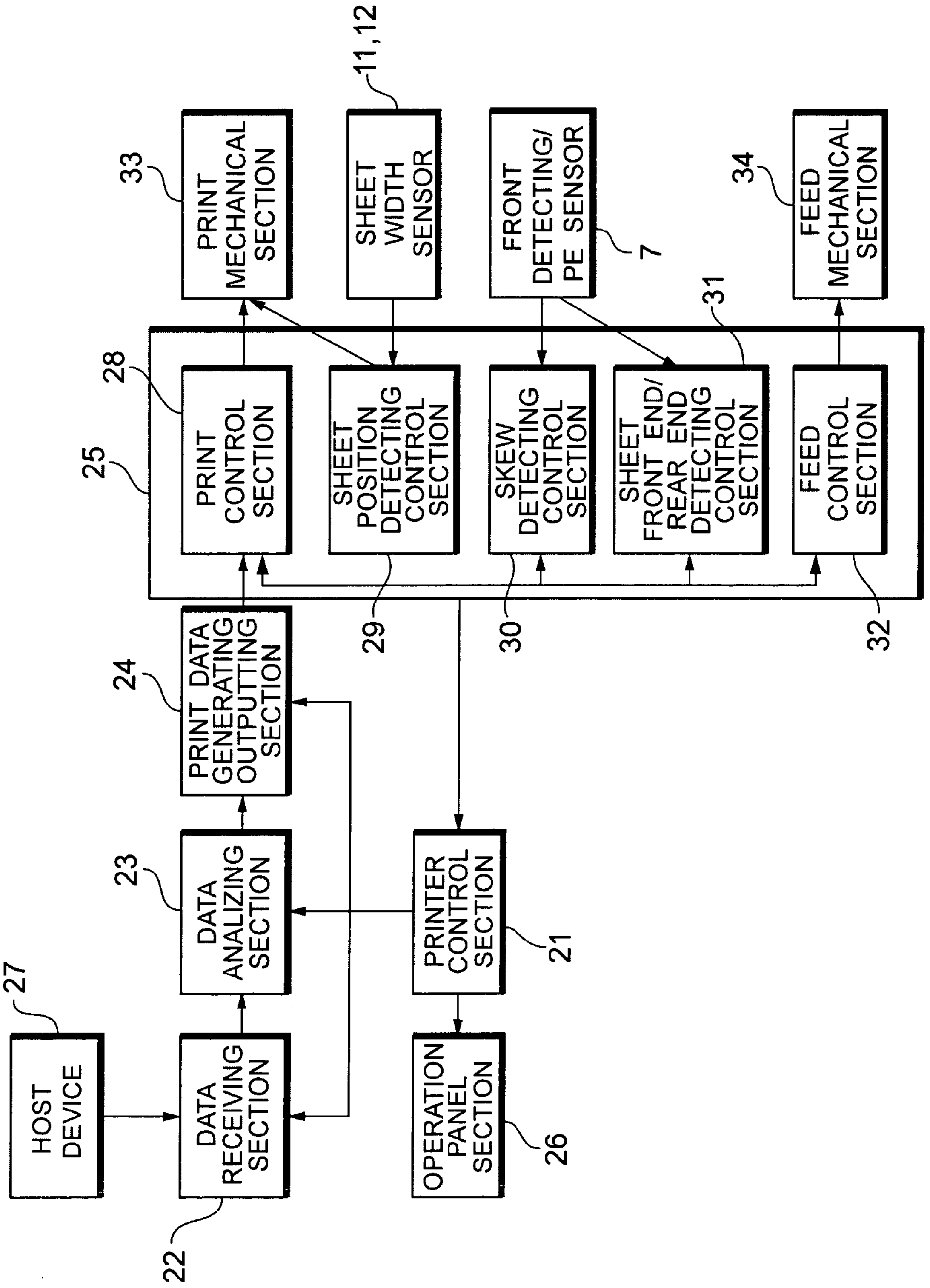
FIG. 12 is a block diagram showing a control system of a printer according to Embodiment 4.

FIG. 12 is a block diagram showing a control system of a printer of Embodiment 4. In FIG. 12, a printer control section 21 is a main control section of apparatus. It controls a data receiving section 22, a data analyzing section 23, a print data generating/outputting section 24, mechanical control section 25 and an operation panel section 26. The data receiving section 22 inputs print data etc. from a host device 27. The data analyzing section 23 analyzes data received by the data receiving section 22. The print data generating/outputting section 24, according to result obtained from analysis of the data analyzing section 23 generates print data expanded as a bit map data, and sends out print data generated to a print control section 28.

The mechanical control section 25 comprises a print control section 28, a sheet position detecting control section 29, a skew detecting control section 30, a sheet front end/rear end detecting control section 31, and a feed control section 32. The print control section 28 moves carriage 9 by driving a space motor of print mechanical section not shown in the drawings. The print control section 28 performs print control of print data expanded as a bit map by print data generating/outputting section 24.

The sheet position detecting control section 29 is connected with sheet width sensors 11 and 12. The sheet position detecting control section 29 detects positions of edges of sheet by signals received from the sheet width sensors 11 and 12, while it moves carriage 9 by driving a space motor of print mechanical section not shown in the drawings. The skew detecting control section 30 detects the front edge portion of print sheet 2, by plural front edge detecting/paper end sensors 7 when a sheet 2 is fed. The skew detecting control section 30 detects skew of sheet 2 by measuring difference of feed quantity until each of plural front edge detecting/paper end sensors 7 detect front edge portions of sheet 2 respectively.

The sheet front end/rear end detecting control section 31 is connected with front edge detecting/paper end sensors 7 and it performs detection of front edge, detection of rear edge, and detection of end of sheet by signals from plural front edge detecting/paper end sensors 7. The feed control section 32 performs control of sheet feeding operation, of sheet issuing operation of line changing operation, and of page changing operation; by driving a feed motor of print mechanical section not shown in the drawings.

The operation panel section 26 performs detection of turning on state of switches on a operation panel, and presentation to a presenting section (LCD or LED) not shown in the drawings.

<Operation>

Figure 13:
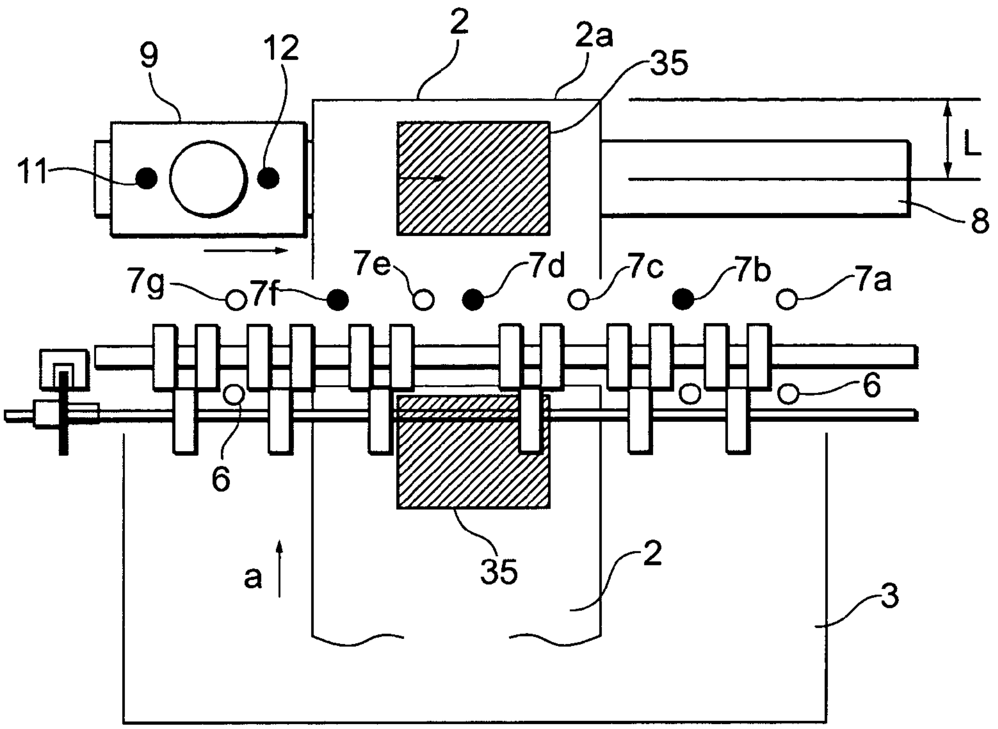
FIG. 13 is a plan view showing operation of Embodiment 4.

Subsequently described is an operation of detecting sheet width according to Embodiment 4. FIG. 13 is a plan view showing operation of Embodiment 4. Printing operation is started, by operation of an operator or by indication from a host device 27. At first, front feed rollers 4 and skew correcting rollers 5 are revolved with indication of feed control section 32 of mechanical control section 25. Then, print sheet 2 set on table 3 is fed in direction indicated by an arrow "a" shown in FIG. 13. Length of feeding, is equal to a distance L (¼ inch for example) that front edge of sheet 2 reaches to a position separated from position of sheet detecting sensors 11 and 12 on carriage 9.

Incidentally, it is provided that there is a pre-printing portion 35, that is, a black portion on surface of print sheet 2. Moreover, existence of print sheet 2 is detected by each of front detecting/PE sensors 7 respectively, in the occasion when print sheet 2 is fed. For example, in the occasion when print sheet 2 is fed as shown in FIG. 13, existence of print sheet 2 is detected by each of front detecting/PE sensors **7*c*, 7*d*, 7*e*, 7*f* respectively Absence of print sheet 2 is detected by each of the other front detecting/PE sensors 7*a*, 7*b*, 7*g* respectively. The pre-printing portion 35 on carriage 9 passes through where light of sensor 7*d* is cast. However, there are white portions before and after the pre-printing portion 35. Therefore, at these white portions, the sensor 7*d*** detects existence of sheet.

After the print sheet 2 is fed by a prescribed distance L, a space motor of print mechanical section 33 is driven by sheet position detecting control section 29. The carriage 9 is moved from left to right, or from right to left. Thereby, detection of position of sheet 2 is performed according to signals outputted from sheet detecting sensors 11 and 12 moved with carriage 9.

FIG. 13 shows an occasion when carriage 9 is moved from left to right. In FIG. 13, in the occasion when carriage 9 is moved from left to right; the sheet detecting sensors 11 and 12 are moved; from a position of sensor **7*g*, that is, a sensor neighboring at left side of left end sensor 7*f* among sensors (7*c*, 7*d*, 7*e*, 7*f*) of front detecting/PE sensors 7 which detected existence of sheet; to a position of sensor 7*b*, that is, a sensor neighboring at right side of right end sensor 7*c* among sensors (7*c*, 7*d*, 7*e*, 7*f*) of front detecting/PE sensors 7 which detected existence of the sheet. Then, detection of the left end portion and the right end portion of sheet 2**, is performed.

In Embodiment 4, a sheet width detecting sensor 11 is used for detection of left end portion of print sheet 2 and a sheet width detecting sensor 12 is used for detection of right end portion of print sheet 2. Therefore, at first, carriage 9 is moved positioning the sheet width sensor 11 at the position of sensor **7*g* and detection of sheet position and sheet width start from this position. Thereafter, carriage 9 moves to right, for the sheet width detecting sensor 12 to come up to the position of sensor 7*b***. In the meantime, operation of detection is performed.

Thus, a sheet width detecting sensor 11 is used for detection of left end portion of print sheet 2 and a sheet width detecting sensor 12 is used for detection of the right end portion of print sheet 2. Thereby, the range of moving carriage 9 for detection, is shortened and this enables detecting both end portions of a sheet having broader width. In operation described hereafter, carriage 9 moves from left to right. However, similar operation can be performed by moving carriage 9 from right to left.

Figure 14:
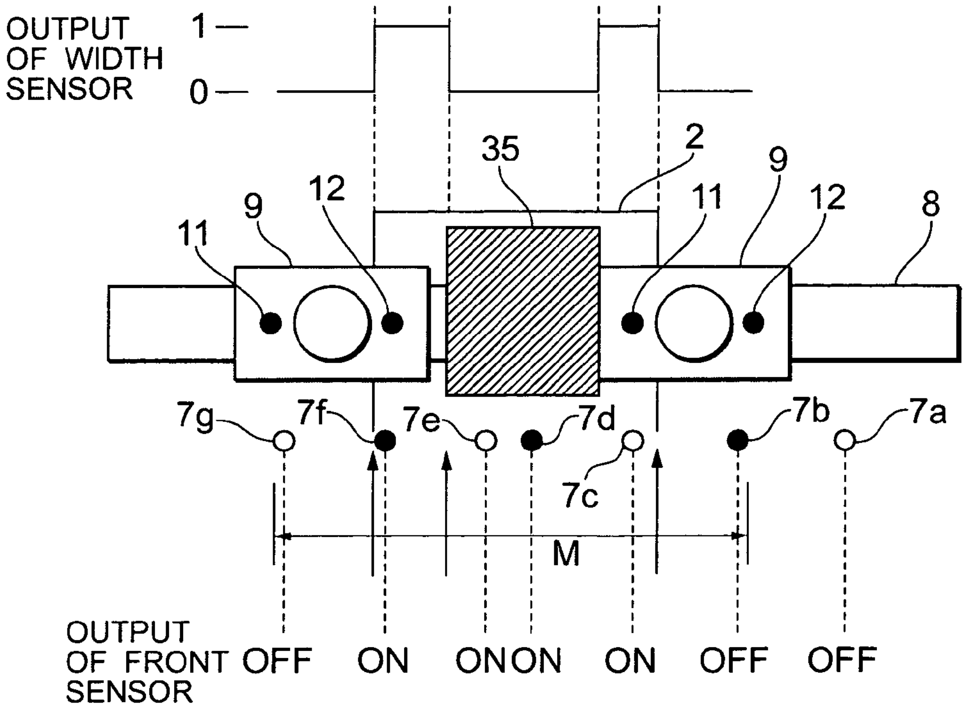
FIG. 14 is a plan view showing operation of Embodiment 4.

A state of positioning sheet width detecting sensor 11 at a position slightly left from the position of sensor **7*g*, is shown in FIG. 14. The carriage 9 moves from this state then a position where existence of sheet is detected at first is made the left end position of sheet. A position where existence of sheet is detected at last, and where absence of sheet is detected at first, is made the right end position of the sheet. When sheet is fed, there can be an occasion when there is not any sensor outside of range where existence of sheet is detected by front detecting/PE sensor 7**. In this occasion, position of extreme left end or position of extreme right end is made the position to start moving or the position to end moving.

Figure 15A:
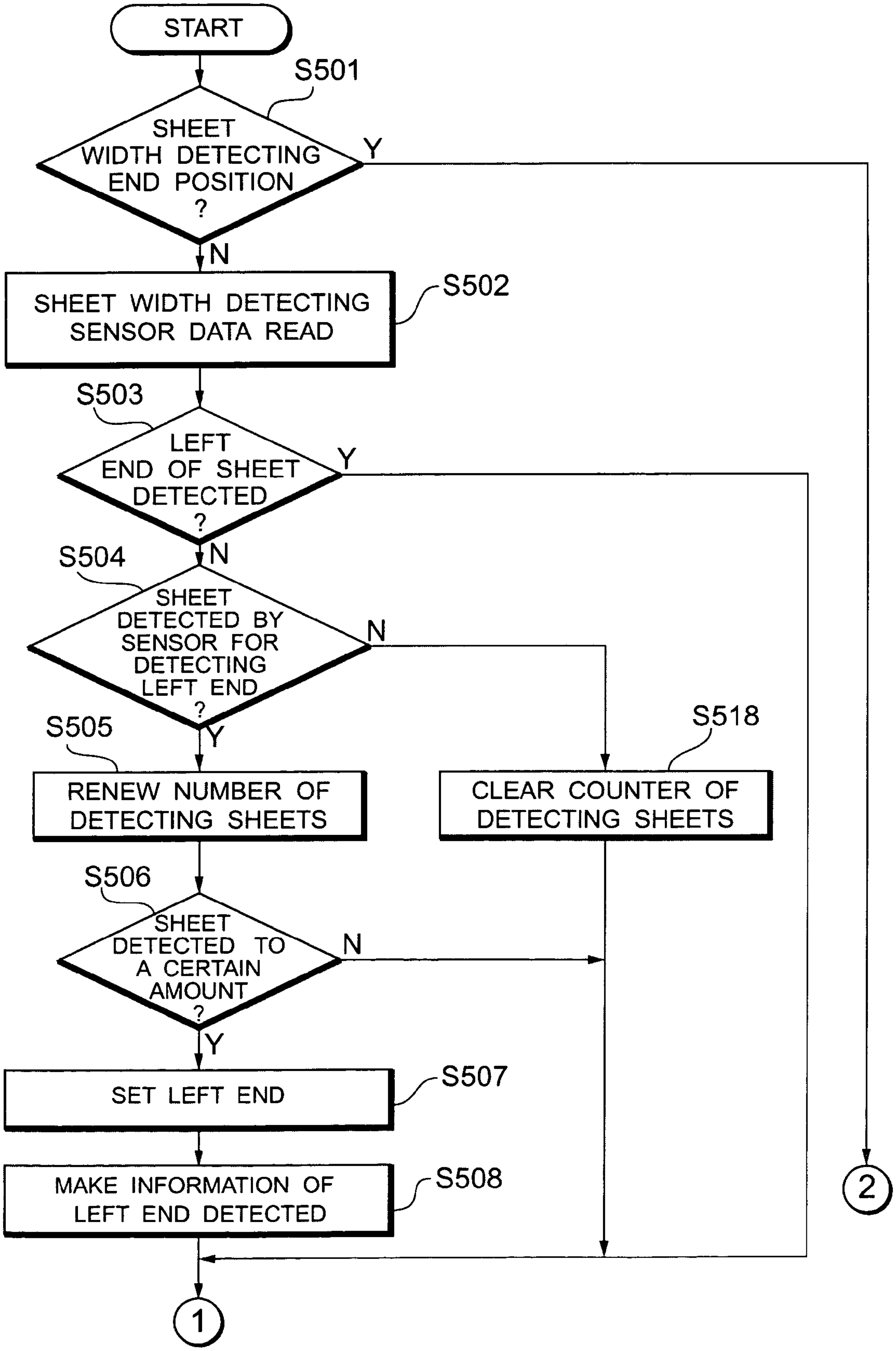
FIG. 15 is a flow chart showing operation of Embodiment 4.
Figure 15B:
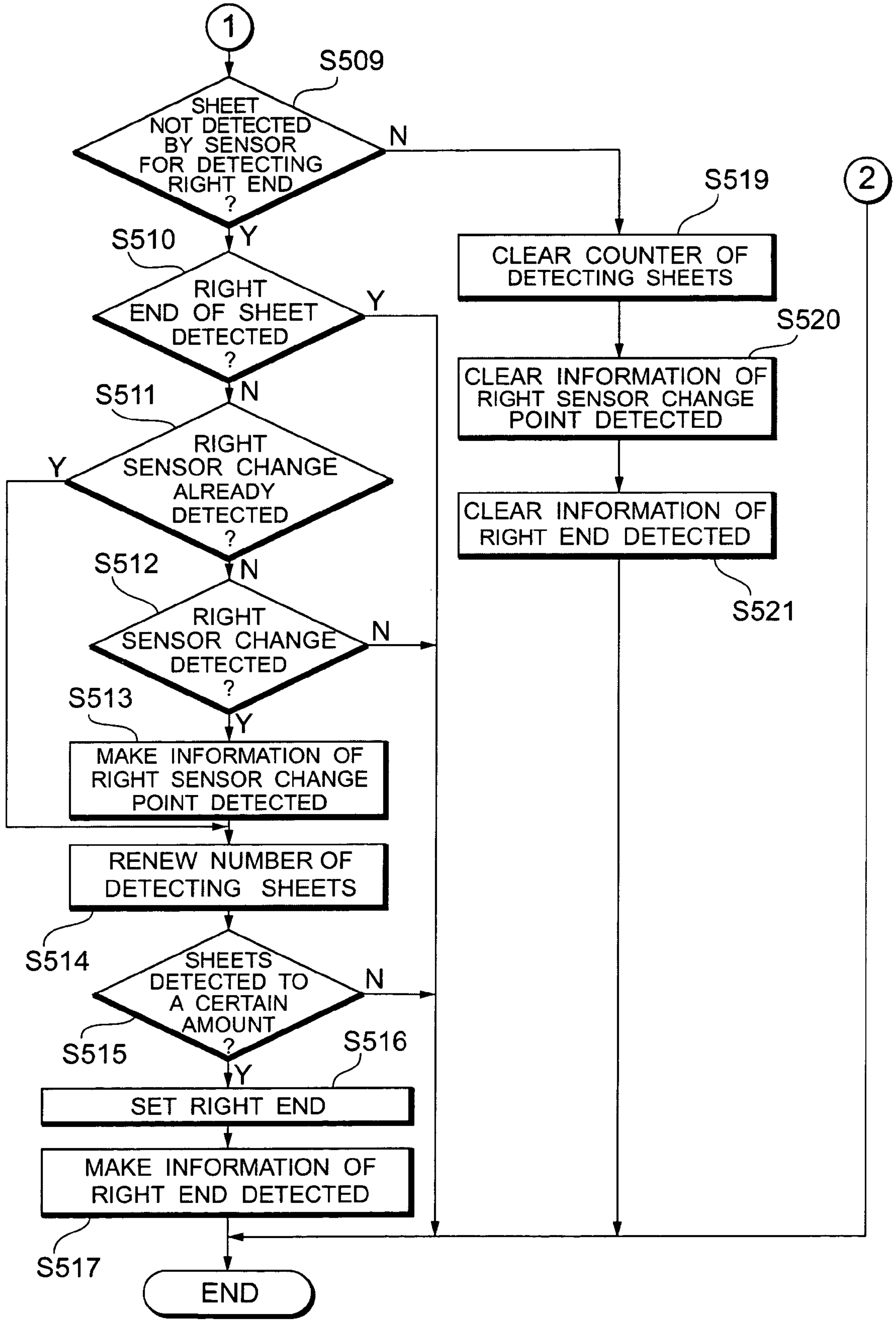

Hereafter described in detail, is an operation of detecting the left end position and the right end position of sheet 2, referring to flow chart shown in FIG. 15. A sheet position detecting control section 29 reads output of sheet width detecting sensors 11 and 12 at each prescribed interval and the process shown in FIG. 15, is performed. The prescribed interval is set to, for example, 1/180 inch of moving carriage 9. The process shown in FIG. 15 is performed while carriage 9 is moving.

At first, the sheet position detecting control section 29 checks whether carriage 9 moved to an end position of detecting sheet width (step 501). Here, the end position is decided by front detecting/PE sensor 7 and it is a position where sheet width detecting sensor 12 came up to sensor 7*b*. If carriage 9 moved to the end position of detecting sheet width, then the process of detecting ends.

If carriage has not yet moved to the end position of detecting sheet width, then, the sheet position detecting control section 29 reads output information of sheet width detecting sensors Hand 12 (step 502). In this occasion, it checks whether the left end of sheet 2 has been detected or not (step 503). This check is performed by checking whether a flag indicating completion of detection mentioned later, is put out or not. If it is judged that the left end of sheet has already been detected, then, the process proceeds to an operation of detecting the right end of sheet 2. If the left end of sheet has not yet been detected, then, the sheet position detecting control section 29 checks whether sheet width detecting sensor 11 read at step 502 has detected existence of sheet or not (step 504).

At step 504, if sheet width detecting sensor 11 for detecting the left end, has already detected existence of sheet, then sheet existence detecting number (1*c*) of sheet width detecting sensor 11 for detecting left end is renewed by adding one (step 505). Subsequently at step 506, checked whether sheet existence detecting times (1*c*) have become a prescribed value (1*x*). If sheet existence detecting times (1*c*) have become a prescribed value (1*x*), then it is judged that sheet existence has been detected across a prescribed length from left end position of sheet 2. Sheet existence detecting times (1*c*) detected by sheet width detecting sensor 11 is then subtracted from reading times by sheet width detecting sensor 11 being read from starting time point of moving carriage 9 until present time point. Thereby, the left end position of sheet 2 is calculated. And, the calculated value (1*p*) is set to RAM (step 507).

If the left end position (1*p*) of sheet 2 is calculated, information (1*pf*) indicating that the left end has been detected is set (step 508). This information is used in the occasion when whether the left end has been detected or not is checked at step 503.

At step 506, the detecting times (1*c*) of sheet width detecting sensor 11 has not yet reached to a prescribed value, the process proceeds to process of detecting the right end of sheet.

Moreover, at step 504, if the sheet width sensor 11 for detecting left end does not detect existence of the sheet, again left end position of sheet is detected. Therefore, the detecting times of sheet existence by sheet width detecting sensor 11 is cleared (step 518) and the process proceeds to process of detecting right end of sheet.

In the occasion of detecting the right end position of sheet 2, the sheet position detecting control section 29 checks whether sheet width detecting sensor 12 for detecting the right end has detected existence of sheet or not (step 509). If it has detected existence of sheet, then sheet existence detecting number by sheet width detecting sensor 12, information of detecting changing point (sheet existence changes to no existence) by sheet width detecting sensor 12, and information of completion of detecting right end is cleared (step 519 to 521). By clearing these of information, in the occasion when right end is wrongly detected owing to existence of pre-printing portion, information wrongly detected is cleared. If then it becomes possible to detect a changing point from existence of sheet to no existence of sheet.

At step 509, in the occasion when sheet width detecting sensor 12 is detecting no existence of sheet, the control section 29 checks whether the right end of sheet 2 has been detected or not (step 510). This check is performed by checking whether a flag indicating completion of detection mentioned later, is put out or not. If the right end of sheet has already been detected, then the process of detecting right end, ends. If the right end of sheet has not yet been detected, then it checks whether sheet width detecting sensor 12 has detected a point of changing (sheet existence to no existence of sheet) (step 511).

If sheet width detecting sensor 12 has not yet detected a point of changing from sheet existence to no existence of sheet, sheet width detecting sensor 12 detects point of changing from sheet existence to no existence of sheet (step 512). If sheet width detecting sensor 12 detects a point of changing, information of point changing completion (rpc) is set (step 513). The check whether sheet width detecting sensor 12 has detected a point of changing or not, at step 511, is performed by using this data of information (rpc). If a point of changing is not detected, then the process of detecting the right end, ends.

If sheet width detecting sensor 12 detects a point of changing, then sheet absence detecting number (rc) of sheet width detecting sensor 12 is renewed by adding one (step 514). If sheet absence detecting times (rc) exceeded a prescribed value (rx) (step 515), then it is judged that sheet absence has been detected across a prescribed length from the right end position of sheet 2. Sheet absence detecting times (rc) detected by sheet width detecting sensor 12 is then subtracted from reading times by sheet width detecting sensor 12 being read from starting time point of moving carriage 9 until present time point. Thereby, the right end position of sheet 2 is calculated and the calculated value (rp) is set to RAM (step 516).

If the right end position (rp) of sheet 2 is calculated, information (rpf) indicating that the right end has been detected is set (step 517). This information is used in the occasion when whether the right end has been detected or not is checked at step 510. If the sheet absence detecting times (rc) does not exceed a prescribed value (rx) at step 515, then the process of detecting right end ends.

The processes mentioned above are performed at each prescribed interval (1/180 inch) in range M shown in FIG. 14, that begins at position where sheet width detecting sensor 11 confronts with sensor 7*g*, and that ends at a position where sheet width detecting sensor 12 passes by sensor 7*b*. Then, the left end position and the right end position of sheet 2 are decided.

As described above, carriage 9 is moved between sensors neighboring outside of the left end sensor and the right end sensor among front detecting/PE sensor 7 detecting sheet existence, so as to detect sheet width. Therefore, the left end position and the right end position of sheet 2 are detected exactly.

<Effects>

As described above, according to Embodiment 4, carriage 9 is moved in the maximum range where the carriage is able to move on the sheet, so as to scan sheet width. The right end position and the left end position are made of extreme changing points. Thereby, the right end position and the left end position are detected exactly, in the occasion when pre-printing portion (black portion) is on the sheet, provided that a prescribed amount of white portion is at each of the left end position and the right end position on sheet 2 and wrong detection owing to existence of pre-printing portion can be avoided. Moreover, according to Embodiment 4, the left end position of sheet 2 is detected by sheet width detecting sensor 11 equipped at left side of carriage 9 and the right end position of sheet 2 is detected by sheet width detecting sensor 12 equipped at the right side of carriage 9. Therefore, it is not necessary to move carriage 9 across the distance between a sensor neighboring outside of the left end sensor detecting sheet existence and a sensor neighboring outside of the right end sensor detecting sheet existence among front detecting/PE sensors 7, in order to detect both end portions of sheet 2.

Incidentally, in Embodiment 4 mentioned above, front detecting/PE sensors 7 are used as means for detecting existence of a sheet in the occasion when a sheet is fed. However, not limited to this, table sensors 6 can be used in detecting a sheet with reflected light obtained by casting a ray of light at one side of sheet.

Embodiment 5

<Configuration>

Subsequently described is Embodiment 5. In Embodiment 4 mentioned above, it is provided that an amount of white portion exists at each of the left and the right end portions of a sheet. However, Embodiment 5 is what enables the detection of an end portion exactly even when a black portion exists at the end portion. Embodiment 5, a function of detecting the left and the right end portions of sheet again, is added to the sheet position detecting control portion 29 of Embodiment 4 shown in FIG. 12. That is, it performs the detection of the left end position end the right end position of a sheet, prescribed times with changing lines separated by a prescribed distance. Other configuration is same as Embodiment 1.

<Operation>

Figure 16:
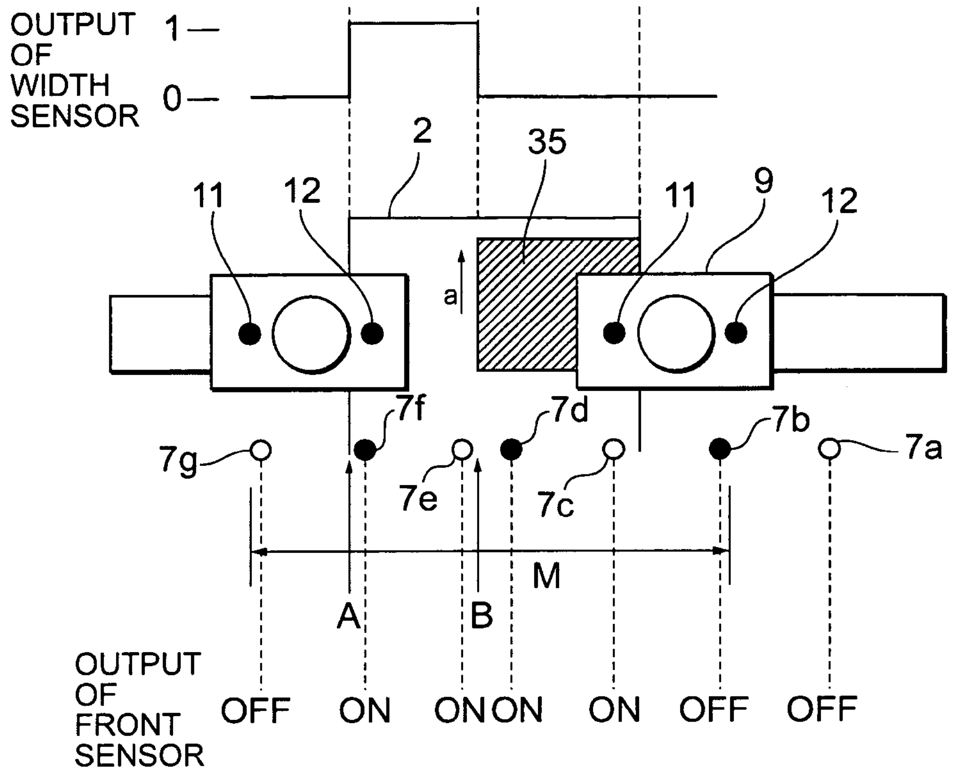
FIG. 16 is a plan view showing operation of Embodiment 5.
Figure 17:
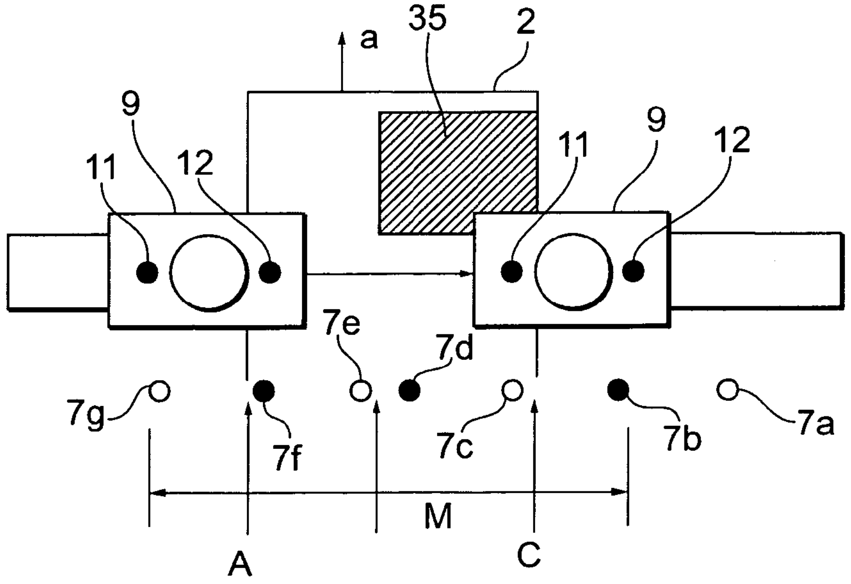
FIG. 17 is a plan view showing operation of Embodiment 5.
Figure 18:
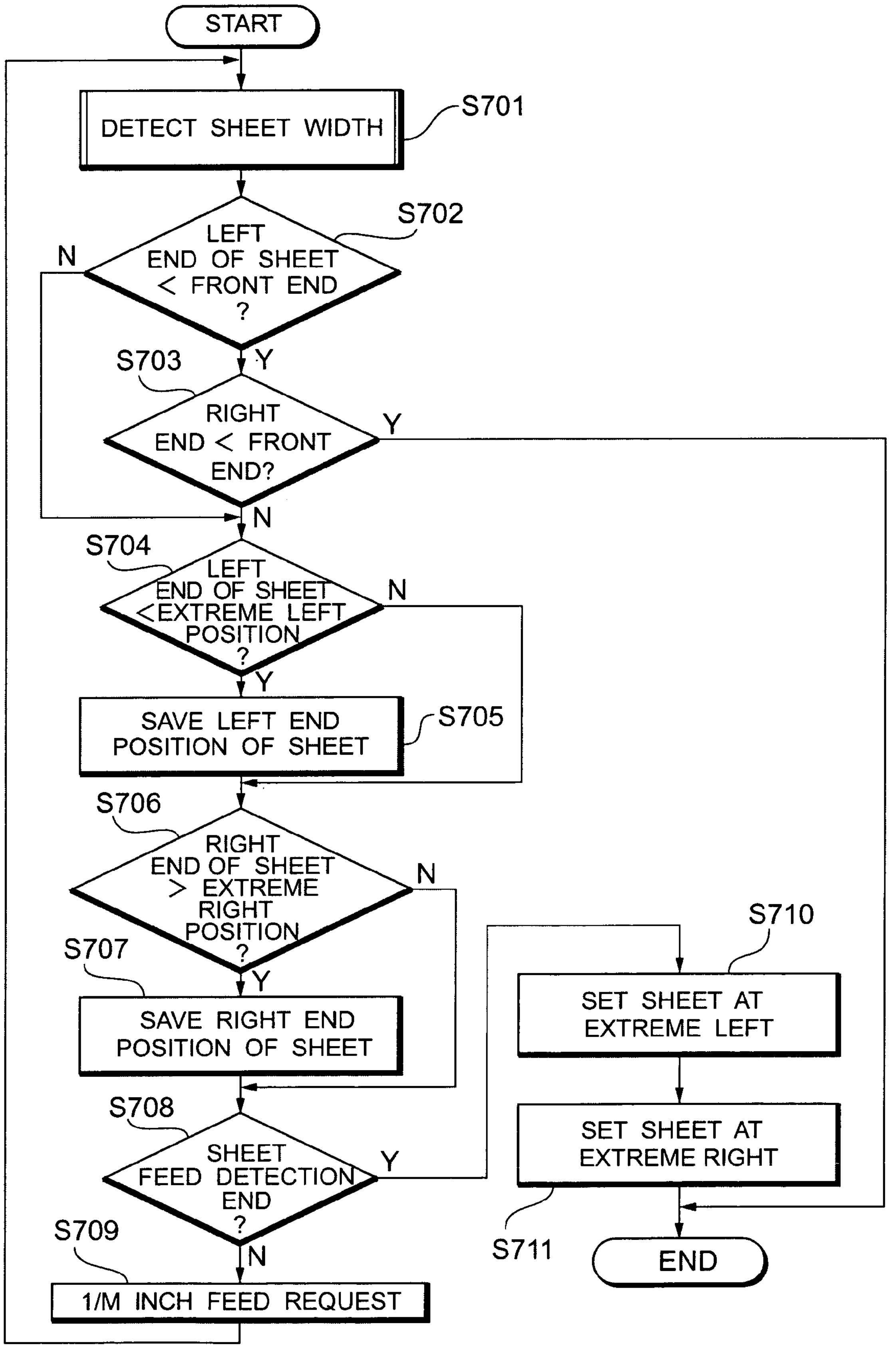
FIG. 18 is a flow chart showing operation of Embodiment 5.

Operation of Embodiment 5 is described referring to FIGS. 16 to 18. FIGS. 16 and 17 are plan views showing operation of Embodiment 5; FIG. 18 is a flow chart showing operation of Embodiment 5. In FIG. 16, a pre-printing portion 35 is formed at right end portion of sheet 2.

The left end position and the right end position of print sheet 2 are detected by a process the same as Embodiment 4 (step 701). As shown in FIG. 16, in the occasion when a pre-printing portion 35 is formed at right end portion of sheet 2, by using a method of detecting end positions according to Embodiment 4, the left end position of a sheet detected is position A. The right end position is position B. Therefore, the left end position is detected exactly. As for the right end position, the left end position of pre-printing position is detected as the right end position of a sheet. In Embodiment 5, after this, following process is performed.

After detecting sheet width, the left end position and the right end position of a sheet are detected and compared with positions of sensor 7*f* of extreme left and sensor 7*c* of extreme right among sensors 7*c*, 7*d*, 7*e*, 7*f* detecting existence of sheet, among front detecting/PE sensors 7 in the occasion of feeding sheet (step 702, 703). That is, the left end position of a sheet detected is compared with the position of sensor 7*f*. At the same time, the right end position of sheet detected is compared with the position of sensor 7*c*.

Here, in the occasion when the left end position of a sheet detected is located at left side of position of sensor 7*f*, at the same time, the right end position of sheet detected is located at right side of position of sensor 7*c*; sheet position detecting control section 29 judges that both the left and the right end portions of a sheet was normally detected, and it ends the process of detecting sheet position.

In the occasion when the left end position of a sheet detected is located at the right side of position of sensor 7*f*, or the right end position of a sheet detected is located at the left side of position of sensor 7*c*; sheet position detecting control section 29 compares the left end position (lp) of a sheet detected this time, with the extreme left end position (slp) of a sheet until last time. In case that left end position (lp) of sheet detected this time, is located at the left side of the extreme left end position (slp) of a sheet until last time (step 704), the left end position (lp) of a sheet detected this time replaces the extreme left end position (slp) of a sheet until last time (step 705).

Subsequently, sheet position detecting control section 29 compares the right end position (rp) of a sheet detected this time, with the extreme right end position (srp) of a sheet until last time. In case that the right end position (rp) of a sheet detected this time, is located at right side of extreme right end position (srp) of sheet until last time (step 706), the right end position (rp) of sheet detected this time, replaces the extreme right end position (sip) of a sheet until last time (step 705).

In Embodiment 5, detection of sheet width at step 701 is performed at every line changing of a prescribed quantity (1/m inch) and whether detection of sheet width is performed at prescribed times or not, is checked (step 708). In case that it is performed at prescribed times, the extreme left and the right end positions detected until present time are respectively set as the extreme left and the right end positions (step 710 711). Then, the process ends.

In case that detection of sheet width is not performed at prescribed times, sheet 2 is fed by a prescribed quantity (1/m inch)(step 709). Then, detection of sheet width is performed again.

<Effects>

As described above, detection of sheet width is performed at every time when a prescribed quantity is fed. Then, the left and the right end positions of a sheet are detected plural times and the left end position located at the extreme left is set as the left end position of sheet. The right end position located at the extreme right is set as the right end position of a sheet. Therefore, as shown in FIG. 17, even in case that pre-printing portion 35 exists at the right end of a sheet, the right end position C detected after pre-printing portion 35 passed is set as the right end position of a sheet. Thus, it becomes possible to detect the exact left and the right end positions of sheet.

Embodiment 6

<Configuration>

Subsequently described is Embodiment 6. Embodiment 6 is also what is able to detect end portions of a sheet exactly, even when black portions exist at end portions. Embodiment 6 is what is added to the mechanical control section 25 of Embodiment 4 shown in FIG. 12; a function of delaying detection of the left and the right end portions of a sheet until the print sheet is fed to printing position of the first line. That is, it is made up for performing detection of the left and the right end positions after printing position on a sheet came to a position confronting with sheet width detecting sensor. The other configuration is same as Embodiment 4.

<Operation>

Figure 19:
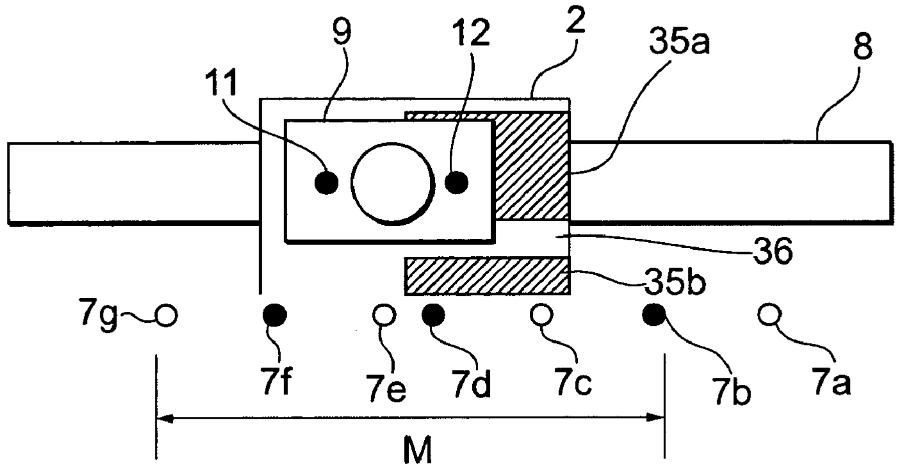
FIG. 19 is a plan view showing operation of Embodiment 6.
Figure 20:
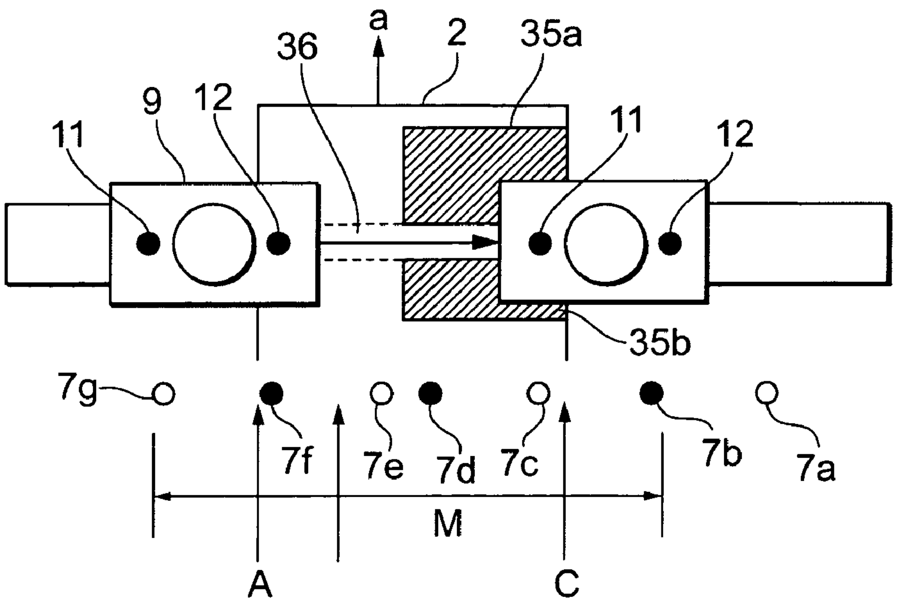
FIG. 20 is a plan view showing operation of Embodiment 6.
Figure 21:
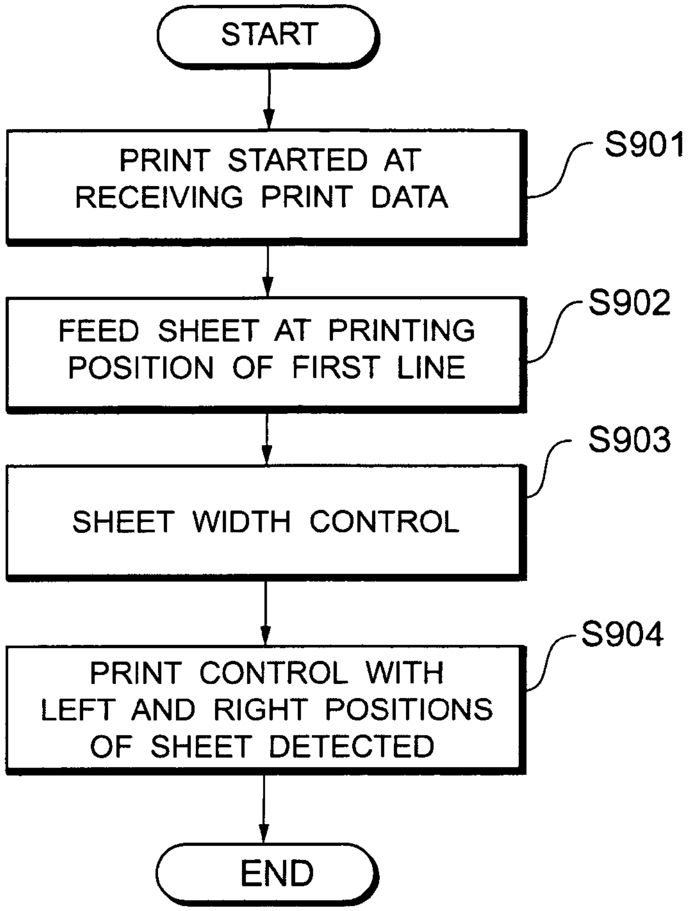
FIG. 21 is a flow chart showing operation of Embodiment 6.

Operation of Embodiment 6 is described referring to FIGS. 19 to 21. FIGS. 19 and 20 are plan views showing operation of Embodiment 6, FIG. 21 is a flow chart showing operation of Embodiment 6. In FIGS. 19 and 20, pre-printing portions 35*a*, 35*b* are formed at the right end portion of sheet 2. Between the pre-printing portions 35*a* and 35*b*, there are some printing lines.

As it is fed, a print sheet 2, which width is detected to some extent by front detecting/PE sensor 7, proceeds to a position for detecting the front end. In this state, the printer waits for print data to come from host device 27. Once received, print data and print start command from the host device 27, the start of printing occurs (step 901) and printing position in the direction of first line is established.

Subsequently, the sheet 2 is conveyed to printing position 36 of first line established (step 902). As finished feeding, before printing at first line, sheet width detecting (detecting left and right ends of sheet) mentioned in Embodiment 4, is performed (step 903). The left end position A, and the right end position B are detected and are set as the left and the right end positions of a sheet and print position control hereafter is performed (step 904).

At printing position, usually, the pre-printing portion does not exist. Therefore, sheet width is detected at printing position of first line. Thereby, it becomes possible to detect the left and the right end positions of sheet accurately and quickly. Incidentally, more accurate detection can be possible, if the detection is performed at a printing line filled with print data, provided that such printing line is detected.

<Effects>

As mentioned above, according to Embodiment 6, it becomes possible to detect the left and the right end positions of sheet without feeding sheet in vain. Therefore, effect of increasing throughput of printing process, can be obtained.

Embodiment 7

<Configuration>

Subsequently described is Embodiment 7. Embodiment 7 is also what is able to detect end portions of a sheet exactly, even when black portions exist at end portions. A function of performing detection of the left and the right end positions of a sheet between the front portion of a sheet and printing position. It is what is added to the feeding control portion 32 of Embodiment 4 shown in FIG. 12. The other configuration is the same as Embodiment 4.

<Operation>

Figure 22:
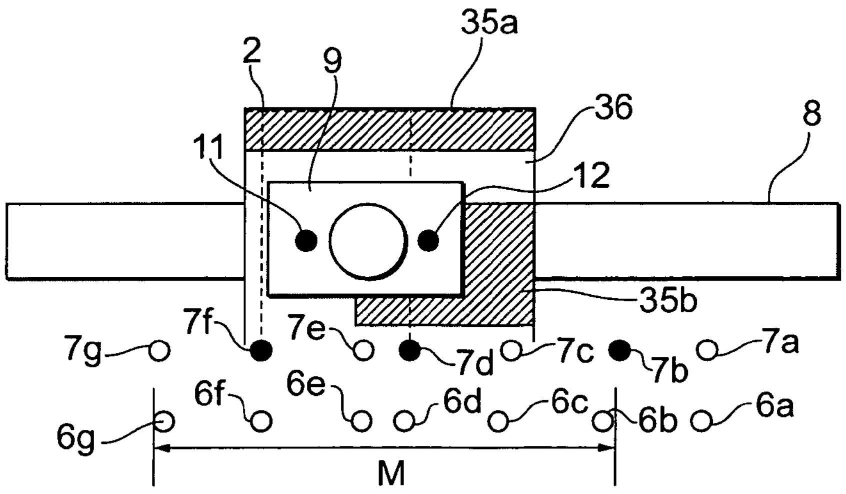
FIG. 22 is a plan view showing operation of Embodiment 7.
Figure 23:
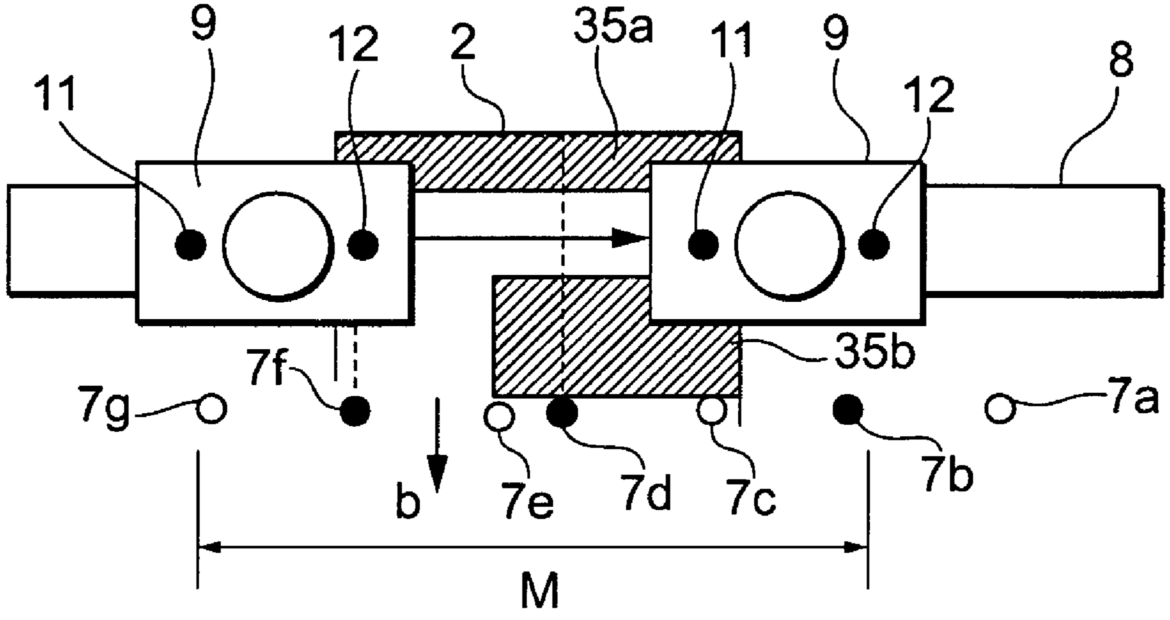
FIG. 23 is a plan view showing operation of Embodiment 7.
Figure 24:
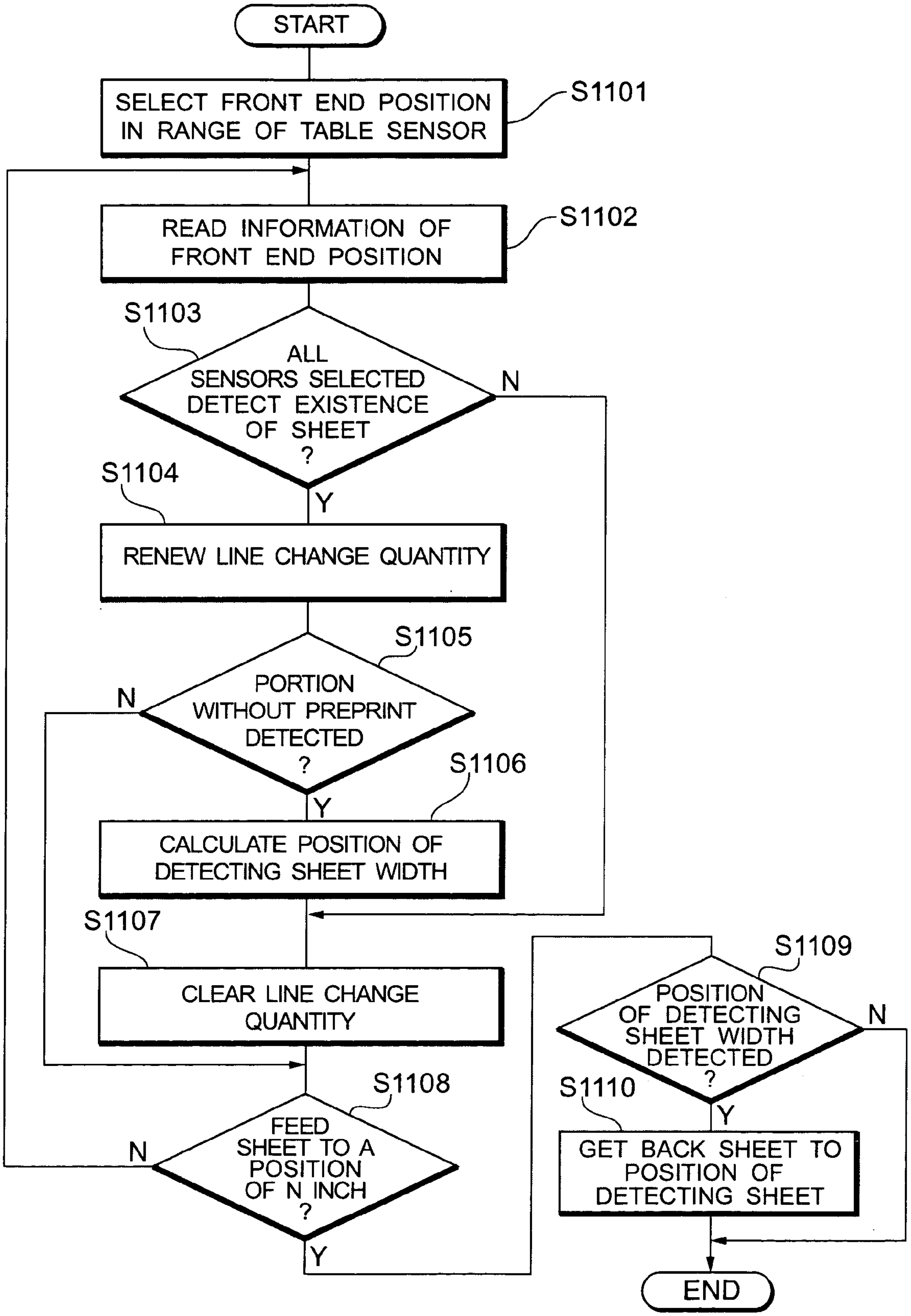
FIG. 24 is a flow chart showing operation of Embodiment 7.

Operation of Embodiment 7 is described referring to FIGS. 22 to 24. FIGS. 22 and 23 are plan views showing operation of Embodiment 7. FIG. 24 is a flow chart showing operation of Embodiment 7. In FIG. 22, pre-printing portions 35*a* and 35*b* are formed at the right end portion of sheet 2. Moreover, as same as in Embodiment 4, table sensors 6 (6*a*, 6*b*, 6*c*, 6*d*, 6*e*, 6*f*, 6*g*) are provided confronting with front detecting/PE sensors 7 (7*a*, 7*b*, 7*c*, 7*d*, 7*e*, 7*f*, 7*g*).

At first, print sheet 2 being set on table, front detecting/PE sensors 7 (7*d*, 7*f*), which are positioned in same range with table sensors (6*b*, 6*c*, 6*d*, 6*e*, 6*f*) detecting sheet existence, and which receive light reflected from sheet 2 cast light from upward, are selected (step 1101).

After starting operation of feeding sheet, feeding control portion 32 reads data detected by front detecting/PE sensors 7 (7*d*, 7*f*) selected at above step 1101 (step 1102). Front detecting/PE sensors 7 (7*d*, 7*f*) selected, all detecting sheet existence or not, are checked (step 1103).

In case that front detecting/PE sensors 7 (7*d*, 7*f*) selected, all detecting sheet existence counter of line changing quantity of detecting sheet existence (dvp) is renewed (step 1104) and it is checked whether line changing quantity of detecting sheet existence (dvp) reached to width (dw) of portion 36 shown in FIG. 22 without pre-printing (step 1105). Here, the width (dw) is wide enough for enabling detection of sheet width. In case that the sheet existence (dvp) reached to width (dw) wide enough for enabling detection of sheet width, the middle position of width (dw) of portion 36 without pre-printing, in the direction of changing lines (in direction of feeding sheet), is calculated from the present position data and counter value of changing lines of sheet existence in direction of changing lines. The middle position is set as position data of detecting sheet width (vp) (step 1106).

After this step, the counter of line changing quantity of detecting sheet existence (dvp), is cleared (step 1107) and following portion able to detect sheet width without pre-printing is detected until a sheet comes to a prescribed end position of sheet feeding (step 1108). In case that portion able to detect sheet width without pre-printing has not detected at step 1105, the portion able to detect sheet width without pre-printing is detected until a sheet comes to a prescribed end position of sheet feeding (step 1108).

In case that either of front detecting/PE sensors 7 (7*d*, 7*e*) has detected absence of sheet at step 1103, the counter of line changing quantity of detecting sheet existence (dvp) is cleared (step 1107) and the following portion able to detect sheet width without pre-printing is detected until a sheet comes to a prescribed end position of sheet feeding (step 1108).

After feeding sheet 2 until it comes to a prescribed end position of feeding, whether sheet width detecting position is detected or not, sheet width is checked by sheet width detecting position data (vp) (step 1109). In case that sheet width detecting position has been detected; according to sheet width detecting position data, as shown in FIG. 23, sheet 2 is fed in inverse direction (a direction designated with arrow b), so as to locate sheet 2 at sheet width detecting position (step 1110). After locating sheet 2 at sheet width detecting position, sheet width detecting process mentioned in Embodiment 1 is performed.

<Effects>

As described above, at feeding sheet, the portion able to detect sheet width without pre-printing is detected by front detecting/PE sensors 7 and sheet width is detected at the portion without pre-printing. Thereby, even when pre-printing portion exists at the end portion of a sheet, it becomes possible to detect the left and the right end portions of a sheet certainly. Moreover, Embodiment 7 is able to detect the left and the right end portions of a sheet exactly, especially about a sheet with discontinuous pre-printing portion existing between the front end and the printing position.

Embodiment 8

<Configuration>

Subsequently described is Embodiment 8. Embodiment 8 is also what is able to detect end portions of a sheet exactly, even when black portions exist at the end portions. A function of setting slice level again in area of pre-printing portion, and a function of detecting sheet width again. It is what is added to sheet position detecting control portion 29 of Embodiment 4 shown in FIG. 12. The other configuration is same as Embodiment 4.

<Operation>

Figure 25:
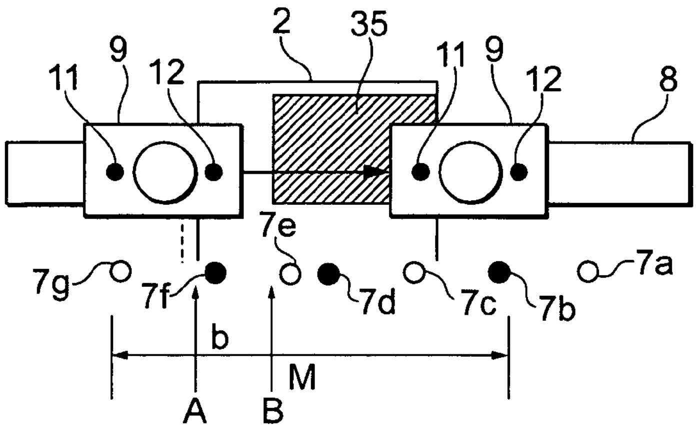
FIG. 25 is a plan view showing operation of Embodiment 8.
Figure 26:
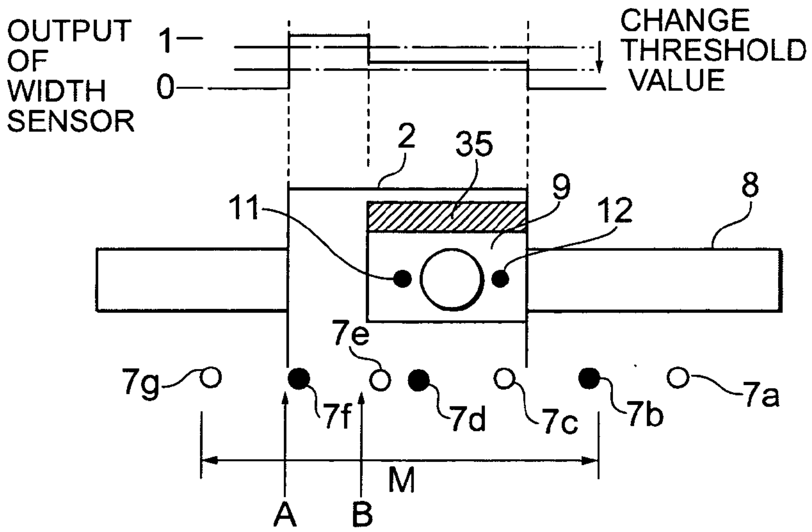
FIG. 26 is a plan view showing operation of Embodiment 8.
Figure 27:
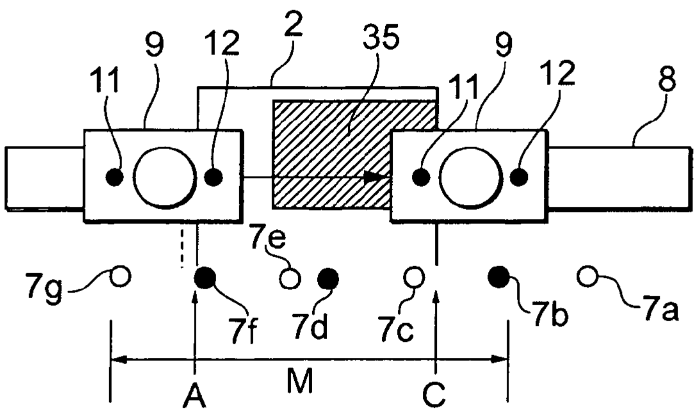
FIG. 27 is a plan view showing operation of Embodiment 8.
Figure 28A:
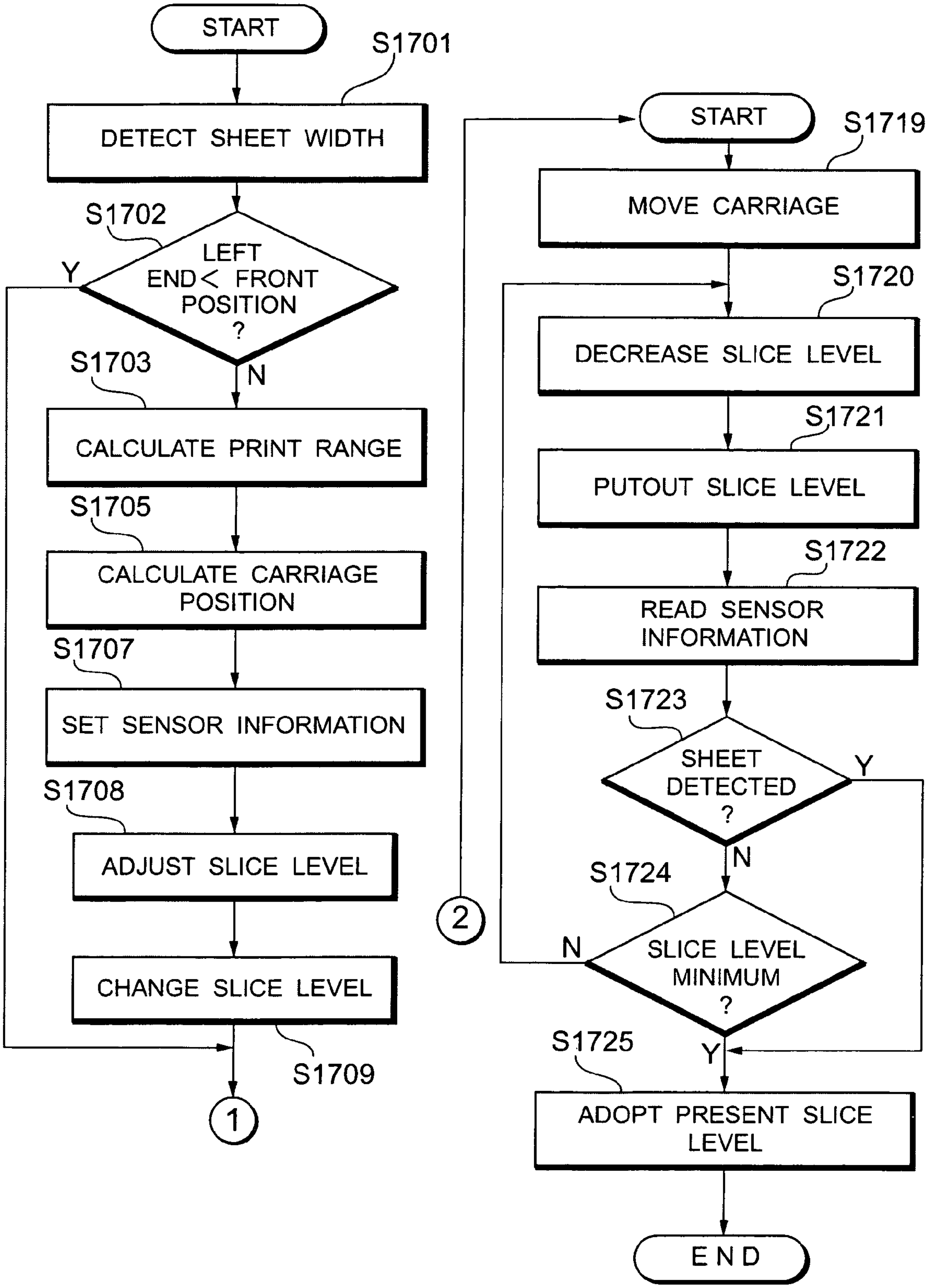
FIG. 28 is a flow chart showing operation of Embodiment 8.
Figure 28B:
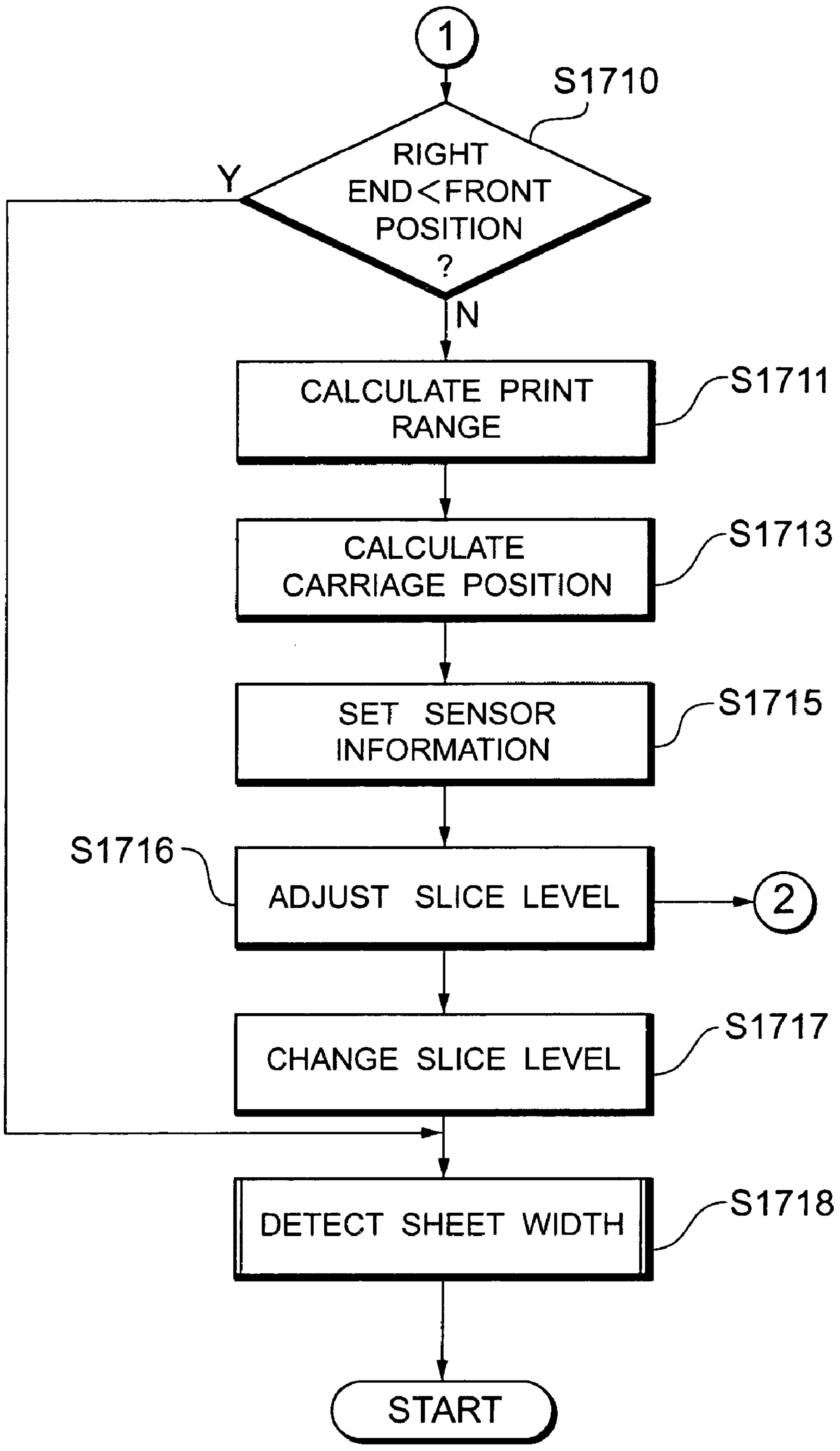

Operation of Embodiment 8 is described referring to FIGS. 25 to 28. FIGS. 25, 26 and 27 are plan views showing operation of Embodiment 8. FIG. 28 is a flow chart showing operation of Embodiment 8. In FIG. 25, a pre-printing portion 35 is formed at right end portion of sheet 2.

At first, the left end position and the right end position of print sheet 2 are detected by a process the same as Embodiment 4 (step 1701). As shown in FIG. 25, in the occasion when a pre-printing portion 35 is formed at the right end portion of sheet 2, by using a method of detecting end positions according to Embodiment 4, the left end position of sheet detected is position A and the right end position is position B. Therefore, the left end position is detected exactly. As for the right end position, the left end position of the pre-printing position is detected as the right end position of sheet.

In order to confirm that pre-printing portions exist at the left end position of a sheet, the left end position A detected at step 1701 mentioned above, is compared with the position of sensor 7*f* of extreme left among front detecting/PE sensors 7 (step 1702). In case that the left end position A is on the left side of front detecting/PE sensor 7*f*, it is judged that the left end position of a sheet is correctly detected and check of the existence of pre-printing portion at the right end position begins.

In case that the left end position A is on the right side of front detecting/PE sensor 7*f*, it is judged that a pre-printing portion exists at the left end position. And, the pre-printing portion at the left side is calculated (step 1703). The pre-printing portion at the left side is calculated by subtracting the position of front detecting/PE sensor 7*f* from the left end position A of sheet.

Subsequently, a position to move carriage 9 is set so that sheet width detecting sensor 11 for detecting the left end, enters in pre-printing range at the left side calculated (step 1705). The position to move (cp) carriage 9 is calculated as follows. A value is calculated by subtracting sheet width position from the center position of print head. The position to move (cp) carriage 9 is obtained by adding the value to a half of the pre-printing range at the left side.

Subsequently, in order to adjust slice level which is set at sheet width detecting sensor 11 for detecting the left end, sensor data for adjusting slice level such as setting value of slice data etc. is set (step 1707) Slice level is adjusted by slice level adjusting process (step 1708), so as to adjust slice level to a level able to detect pre-printing portion.

Here, described is the adjusting process of slice level. At first, at step 1719, carriage 9 is moved to a position appointed. And, sheet width detecting sensor 11 for detecting the left end is moved into pre-printing range. Then, the slice level of sensor appointed (sheet width detecting sensor 11) is let down with one step (step 1720) and the slice level lowered with one step is put out (step 1721). Then, sensor data of sheet width detecting sensor 11 is read (step 1722).

It is judged whether the sheet width detecting sensor 11 detected existence of sheet (step 1723). In case that existence of a sheet is detected, the slice level outputting now is set as an adjusted value (step 1725). In case that existence of a sheet is not detected, it is judged whether the slice level outputting now is minimum in range able to set (step 1724). In case that slice level outputting now is minimum in range able to set the slice level outputting now is set as an adjusted value (step 1725).

The slice level is usually divided into plural levels and at each level output voltage of the sensor to slice is decided. Then, the setting value of slice level is adjusted minutely and output voltage of the sensor to slice is changed. Thereby, it is possible to detect existence of a sheet at pre-printing portion.

After adjusting slice level, slice level of sheet width detecting sensor 11 at the left side is changed to the adjusted value (step 1709).

Subsequently, in order to confirm that pre-printing portions exist at the right end position of sheet, the right end position B detected at step 1701 mentioned above, is compared with the position of sensor 7*c* of extreme right among front detecting/PE sensors 7 (step 1710). In case that the right end position B is on the right side of front detecting/PE sensor 7*c*, it is judged that right end position of sheet is correctly detected and a second process of detecting sheet width (step 1718), begins.

As shown in FIG. 26, in case that the right end position B is on the left side of front detecting/PE sensor 7*c*, it is judged that a pre-printing portion exists at the left end position. Just as the adjustment of sheet width detecting sensor 11 at the left side; the slice level of sheet width detecting sensor 12 at the right side, is adjusted (step 1711 to 1717).

When adjustment of the slice level of sheet width detecting sensor 11, 12 at the left and the right side are finished, a process of detecting sheet width is performed again by a process the same as in Embodiment 4.

<Effects>

As described above, each slice level of sheet width detecting sensor 11 and 12 is adjusted so as to enable the detecting existence of a sheet, at the pre-printing portion. Therefore, whether a pre-printing portion exists or not, it is possible to detect the left and the right end positions of a sheet exactly. As for an example shown in FIG. 27, even when pre-printing portion 35 exists at the right end portion of a sheet, the right end portion is detected exactly at position C.

Embodiment 9

<Configuration>

Figure 29:
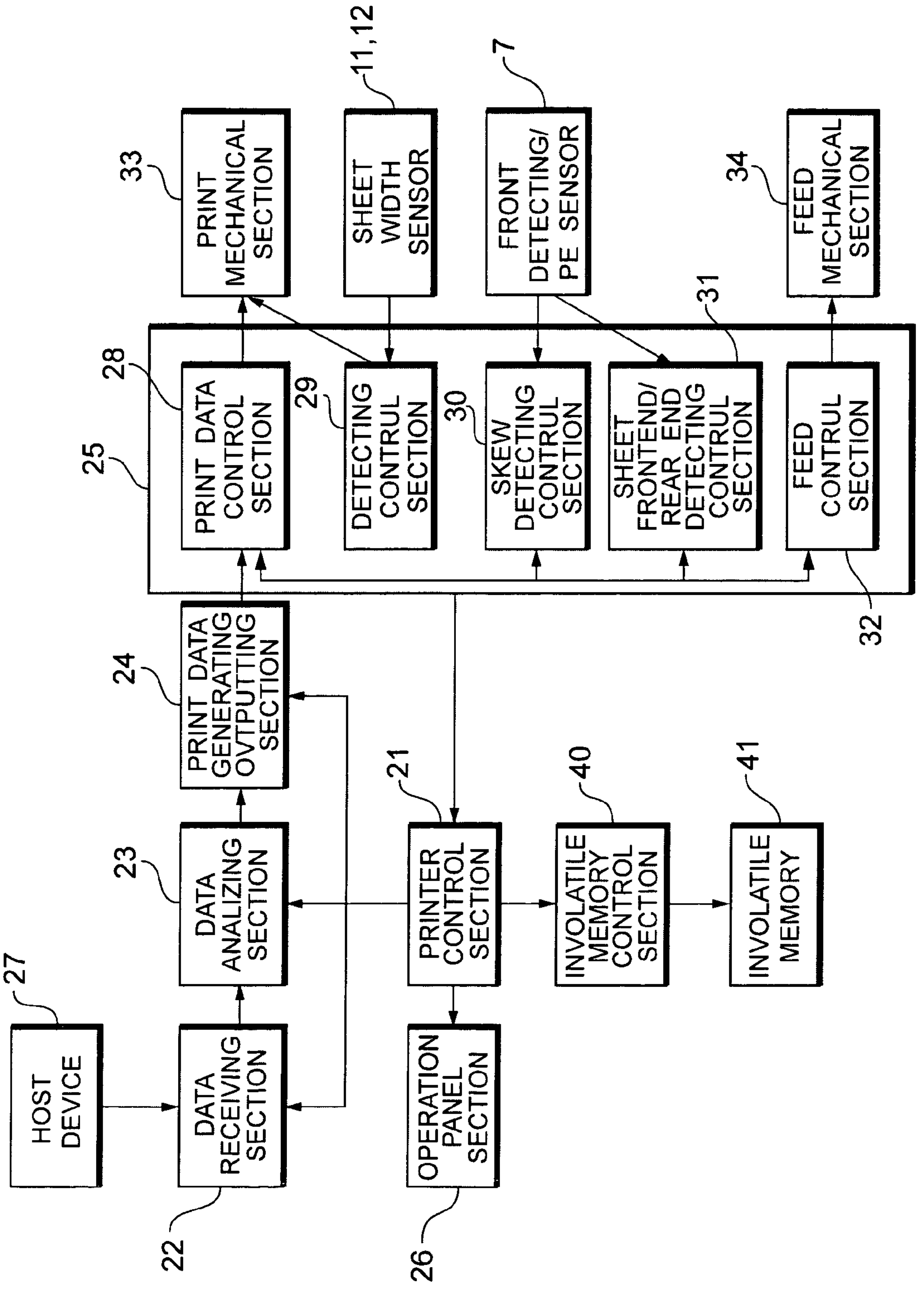
FIG. 29 is a block diagram of Embodiment 9.

Subsequently described is Embodiment 9. FIG. 29 is a block diagram of Embodiment 9. Embodiment 9 is what is added to Embodiment 4 shown in FIG. 12, a nonvolatile memory control section 40. The nonvolatile memory control section 40 controls writing each kind of data to a nonvolatile memory 40 and reading each kind of data from a nonvolatile memory 40 according to the indication of printer control section 21. The other configuration is same as Embodiment 4.

<Operation>

Figure 30A:
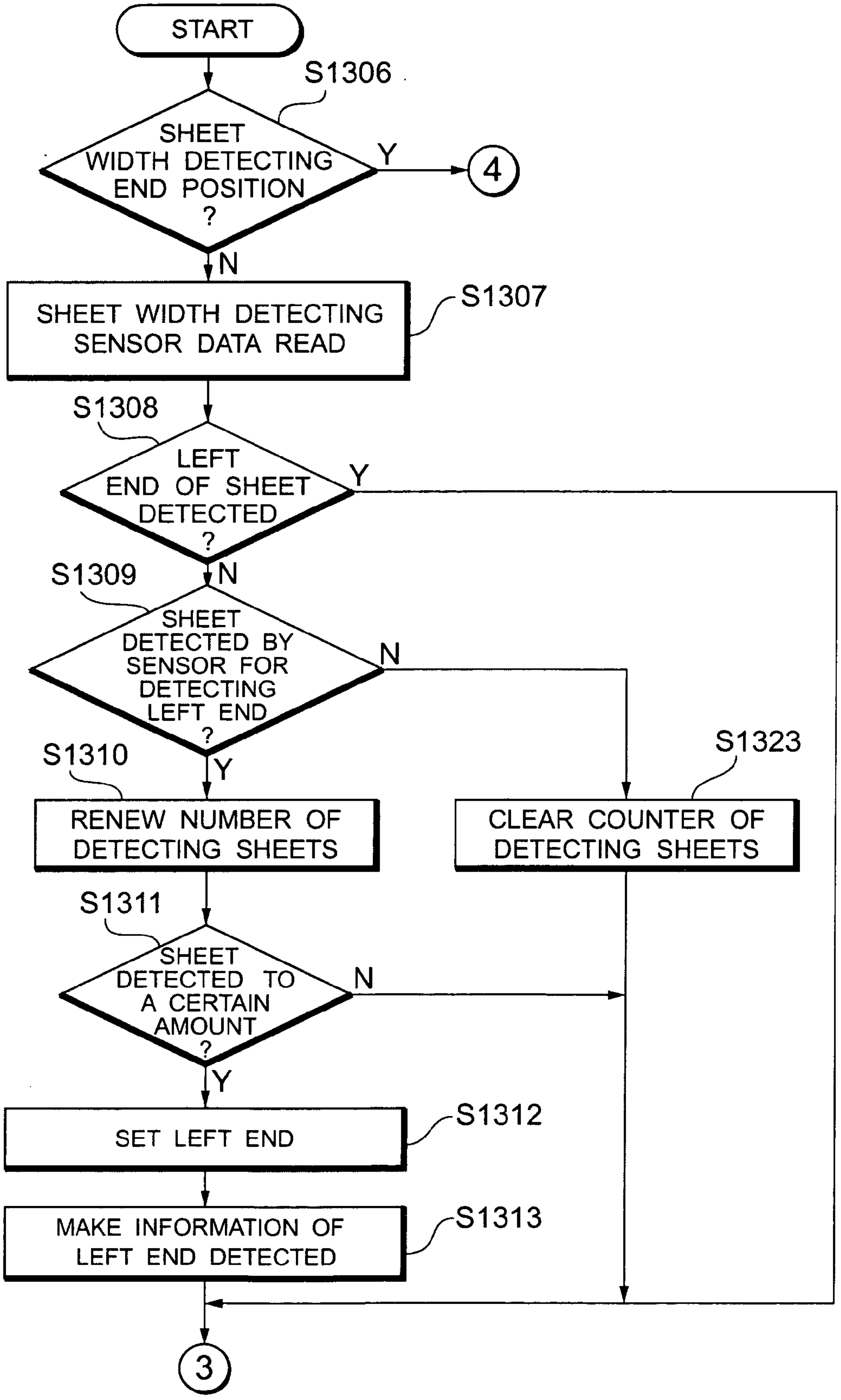
FIG. 30 is a flow chart showing operation of Embodiment 9.
Figure 30B:
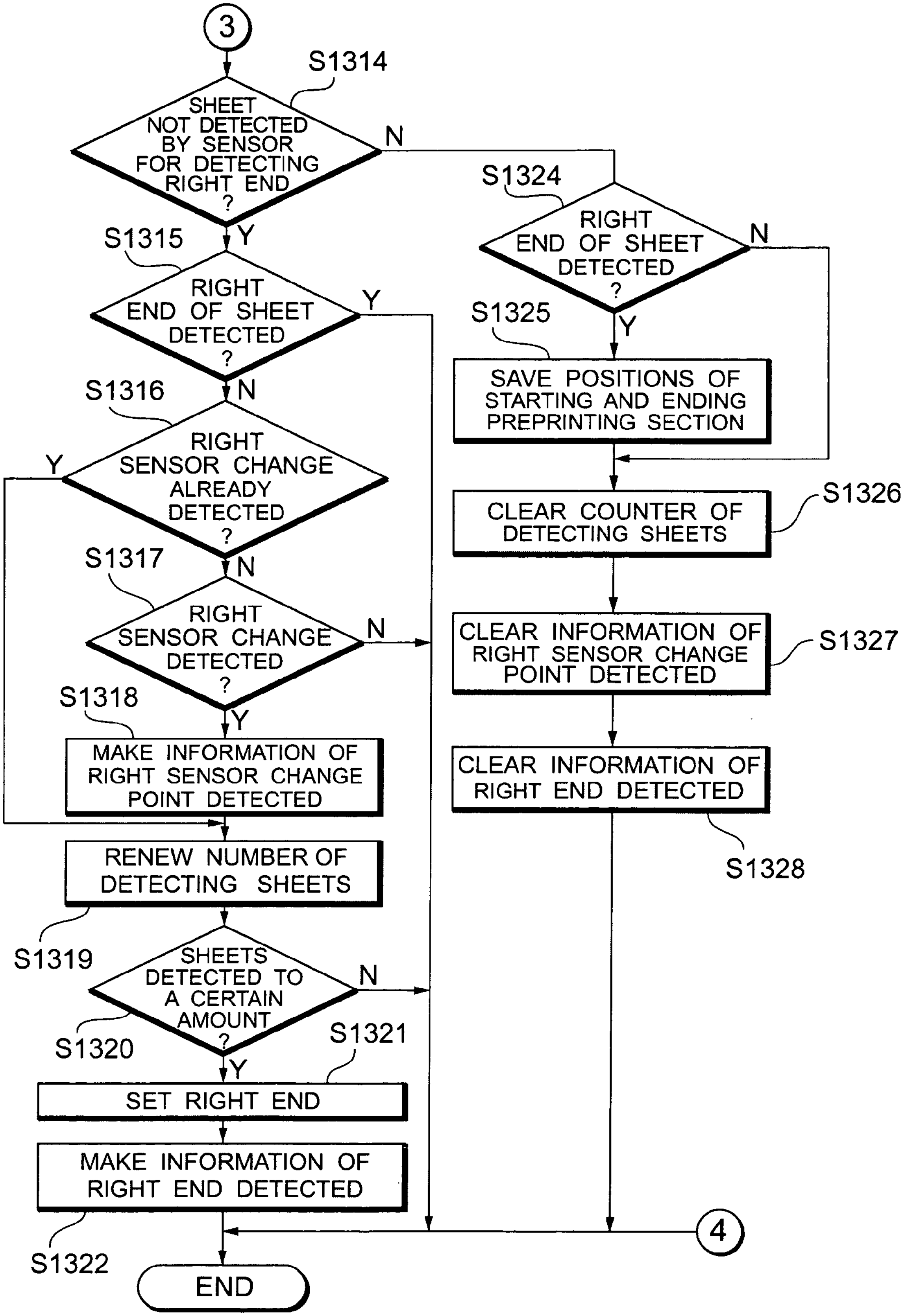

Subsequently, operation of Embodiment 9 is described referring to flow charts of FIGS. 30 to 31. In FIG. 30, processes of steps 1306 to 1323 are same as processes of steps 501 to 518 of Embodiment 4 shown in FIG. 15.

At step 1314, in case that sheet width detecting sensor 12 for detecting the right end, detected existence of sheet, whether the right end position of a sheet has been detected or not, is checked (step 1324). In case that the right end position of a sheet has been detected, it is conceived that the pre-printing portion has been detected. Therefore, the starting position of the pre-printing portion (left end position) and the ending position of pre-printing portion (right end position) are saved in the nonvolatile memory 41 (step 1325). After this step or in case that the right end position of a sheet has not been detected; as same as Embodiment 4, sheet existence detecting times by sheet width detecting sensor 12, changing point detecting data (change sheet existing to not existing) by sheet width detecting sensor 12, and data of right end detected, are cleared (step 1326 to 1328).

Figure 31:
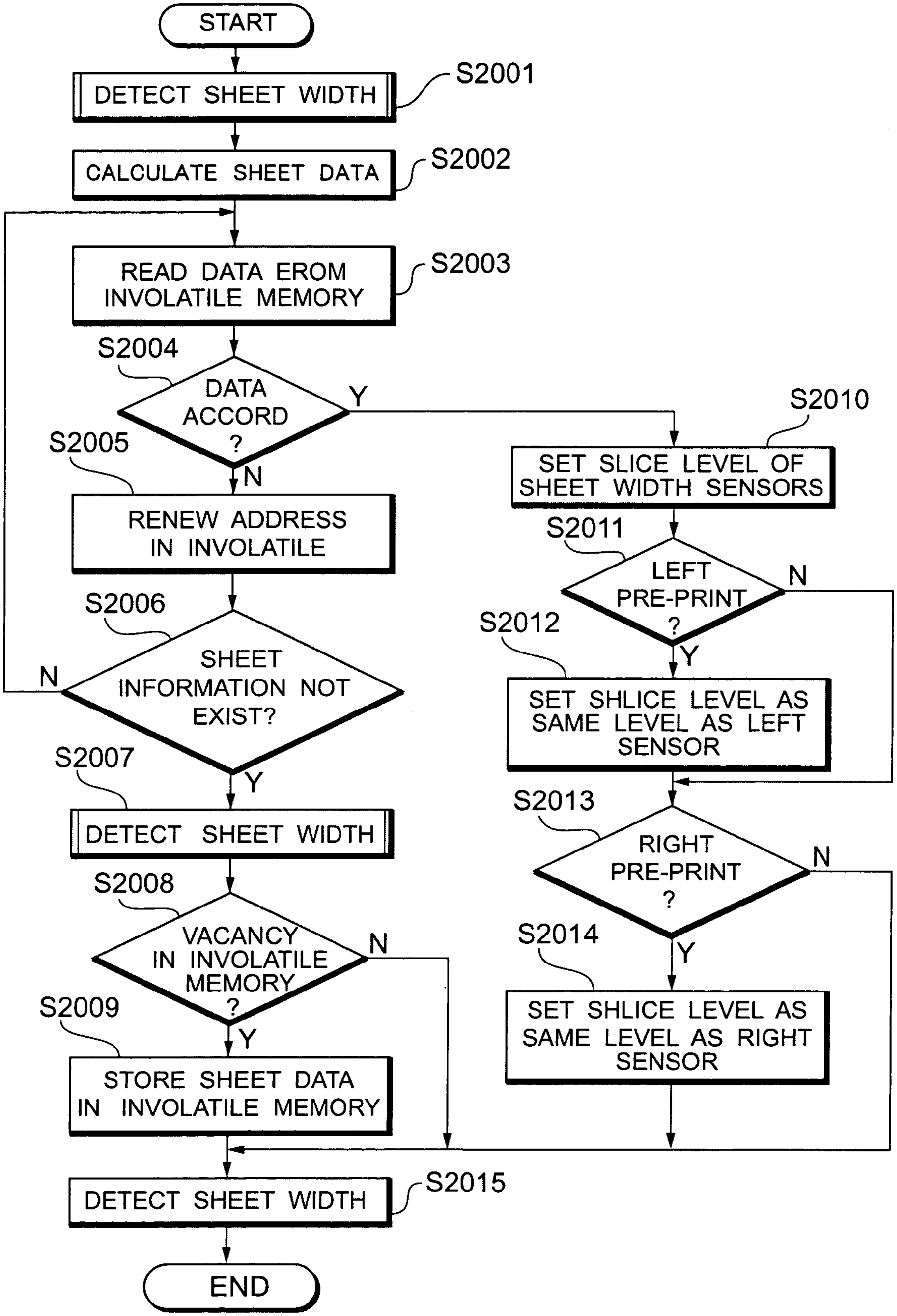
FIG. 31 is a flow chart showing operation of Embodiment 9.

In FIG. 31, step 2001 is a process of steps 1306 to 1328 shown in FIG. 30. As a result of sheet width detecting process of step 2001; sheet width (right end position and left end position), starting/ending position of a pre-printing portion, and sheet data indicating whether pre-printing portions exist at the left and the right ends of a sheet or not, are set in working memory (step 2002).

Subsequently, sheet width, starting/ending position of pre-printing portion, and whether pre-printing portions exist at the left and the right ends of sheet or not, comprising sheet data (sheet data about sheet fed last time or ever), are set in working memory (step 2003). And, these are compared with the sheet data obtained this time. Then, whether they accord or not, they are checked (step 2004). In case that they do not accord, reading address of nonvolatile memory 41 is renewed to next address of sheet data contained (step 2005) and sheet data of this time is compared with all sheet data contained in the nonvolatile memory 41 (step 2006).

Even after comparing with all sheet data contained in the nonvolatile memory 41, there may be none that accords with sheet data of this time. In this case, processes of steps 1701 to 1718 of Embodiment 8 shown in FIG. 28 are performed. Then, sheet width detection and adjustment of the slice level of sheet width detecting sensor 11 and 12, are performed (step 2007). Thereafter, whether there is vacancy in containing area of nonvolatile memory 41, is checked (step 2008). In case that there is vacancy, sheet width, starting/ending position of pre-printing portion, whether pre-printing portions exist at the left and the right ends of a sheet or not, and adjusting data of slice level of sheet width detecting sensors 11 and 12, are contained in the nonvolatile memory 41 (step 2009).

In case that any sheet data contained in the nonvolatile memory 41 accorded with sheet data of this time, slice level value contained in the nonvolatile memory 41 is set to sheet width detecting sensors 11 and 12 of the left and the right sides (step 2010). Further, whether there is a pre-printing portion at the left end position of a sheet or not, is checked (step 2011). In case that there is a pre-printing portion, slice level of front detecting/PE sensors 7 existing on the left side of end position (right end position) of the pre-printing portion, are set to the same level as slice level of sheet width detecting sensors 11 of left (step 2012).

Subsequently, whether there is a pre-printing portion at the right end position of sheet or not, is checked (step 2013). In case that there is a pre-printing portion; slice level of front detecting/PE sensors 7 existing on the right side of start position (left end position) of a pre-printing portion, are set to same level as slice level of sheet width detecting sensors 12 of right (step 2014).

After setting all sheet data, a process of detecting sheet width is performed with the same method as Embodiment 4, so as to settle the left and the right positions of sheet (step 2015).

<Effects>

As mentioned above, sheet data are contained in nonvolatile memory. In case that either of sheet data already contained accords with data of sheet being fed now, adjustment of slice level of sheet width detecting sensors 11 and 12 is not performed. Then, a process of detecting position of sheet is performed by using sheet data contained in nonvolatile memory 41. Therefore, a process of slice level adjustment etc. can be omitted and throughput can be increased. Moreover, sheet data contained in nonvolatile memory 41 is data which accomplished detection of sheet position. Therefore, the left and the right end positions of a sheet can be detected certainly, by using data which accomplished detection.

What is claimed is:

1. A media width detecting apparatus comprising:

a plurality of media detecting sensors provided in a widthwise direction being at right angles to a media conveying path, a side-portion sensor provided on a carriage being situated downstream from the plurality of media detecting sensors in said media conveying path and moving over the media in a widthwise direction as the media is conveyed along said media conveying path;

wherein a media width detecting range of said side-portion sensor is based on detection of a range of an existence of the media in the widthwise direction by said media detecting sensors, and wherein, said side-portion sensor detects changes at extreme left and extreme right in said media width detecting range to detect side portions of said media.

2. A media detecting apparatus according to claim 1:

wherein whether the detection of the side portions of the media is wrong or not, is judged according to result of detection by said media detecting sensors, and according to the result of detection by said side-portion sensor; and in case that the detection is wrong, the detection of side portions of the media is performed again after conveying the media by a prescribed distance.

3. The media width detecting apparatus according to claim 1, wherein said media has at least one pre-printing black portion having no reflection;

said side-portion sensor is an optical sensor of reflection type; and said side portions of said media are detected on the basis of a position in said media width detecting range, where said side-portion sensor first detected an existence of said media according to a reflection, and on the basis of a position in said media width detecting range, where said side-portion sensor last detected an absence of said media according to a non-reflection.

4. A media detecting apparatus according to claim 3: wherein said prescribed position is a printing position.

5. A media detecting apparatus according to claim 1: further comprising a black portion detecting section for detecting black portions in the media;

wherein, avoiding the black portions detected by said black portion detecting section, changing of existence or absence of side portions of the media is detected by said side-portion sensor.

6. A media detecting apparatus according to claim 5: wherein whether detection of the side portions of the media is wrong or not, is judged according to a result of detection by said media detecting sensors, and according to a result of detection by said side-portion sensor; and in case that the detection is wrong, the detection of the side portions of the media is performed again after adjusting a slice level enabling detection of the black portions by using said side-portion sensor.

7. A media detecting apparatus according to claim 6: wherein said side-portion sensor comprises a sensor detecting light reflected from the media; and an output level of said side-portion sensor changes according to a quantity of reflected light, detecting an existence of the media by judging whether the output level is higher or lower than said slice level, then in case that detection is judged wrong, said slice level is lowered.

8. A media detecting apparatus according to claim 6: further comprising a containing section containing sheet peculiar data for containing an adjusting value of said side-portion sensor in case that the detection is judged wrong, wherein, in case that the media is the same as what was previously detected is detected this time, according to said peculiar data; detection of the side portions of the media is performed by using the adjusting value contained in said containing section.

9. A media detecting apparatus according to claim 5: wherein said black portion detecting section is incorporated in said side-portion sensor.

10. A media width detecting apparatus for detecting a width of media, comprising:

a carriage which moves along a movement direction being at right angles to a conveyance direction of said media;

at least one side-portion sensor which is mounted on said carriage and is used for detecting both side-portions of said media while the carriage is moving;

a plurality of media sensors which are situated upstream from said at least one side-portion sensor in said conveyance direction and are arranged along said movement direction; and a controlling section which recognizes at least one of said plurality of media sensors which has sensed said media as a media sensing sensor, sets a side-portion detecting range of said at least one side-portion sensor through judging positions of two of said media sensors that have not sensed said media and are respectively adjacent to said media sensing sensor, and controls said at least one side-portion sensor to sense the both side-portions of said media within said side-portion detecting range to obtain said width of said media.

11. The media width detecting apparatus according to claim 10, wherein said controlling section decides a movement range of said carriage on the basis of said positions of the two said media sensors that are respectively adjacent to said media sensing sensor.

12. The media width detecting apparatus according to claim 10, wherein said controlling section controls said carriage to quickly move outside said side-portion detecting range.

13. The media width detecting apparatus according to claim 10, further comprising a plurality of skew sensors each of which corresponds to one of said plurality of media sensors, wherein the plurality of skew sensors are situated upstream from said media sensors in said conveyance direction and are arranged along the movement direction, the controlling section at least using the skew sensors to judge if the media is skewed.

14. The media width detecting apparatus according to claim 13, wherein said the controlling section further uses the skew sensors and the medium sensors to judge if the media is skewed.

15. The media width detecting apparatus according to claim 13, wherein said controlling section further judges more than two of the skew sensors which have sensed the media and more than two of the media sensors which have also sensed the media, and decides a skew detecting range.

16. The media width detecting apparatus according to claim 10, wherein said media has at least one pre-printing portion having a different reflection rate;

said side-portion sensor is an optical sensor of reflection; and said both side portions of said media are detected on the basis of a position in said side-portion detecting range, where said side-portion sensor first detected an existence of said media according to a quantity of reflection, and on the basis of a position in said side-portion detecting range, where said side-portion sensor last detected an absence of said media according to a quantity of reflection.

17. The media width detecting apparatus according to claim 16, wherein said media is a white paper and said pre-printing portion is a black portion having no reflection, wherein said side-portion sensor detects the existence of said media according to a reflection, and detects the absence of said media according to a non-reflection.

18. The media width detecting apparatus according to claim 10, wherein said at least one side-portion sensor includes a left side-portion sensor and a right side-portion sensor;

said both side-portions of said media are a left side-portion and a right side-portion; and said left side-portion sensor is used to detect said left side-portion and said right side-portion sensor is used to detect said right side-portion.

19. The media width detecting apparatus according to claim 10, wherein said media has at least one pre-printing black portion having substantially no reflection;

said side-portion sensor is an optical sensor of reflection type; and said side portions of said media are detected on the basis of a position in said media width detecting range, where said side-portion sensor first detected an existence of said media according to a reflection, and on the basis of a position in said media width detecting range, where said side-portion sensor last detected an absence of said media according to a non-reflection.

* * * * *